US011374701B2

(12) United States Patent
Matsumura et al.

(10) Patent No.: US 11,374,701 B2
(45) Date of Patent: Jun. 28, 2022

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 427 days.

(21) Appl. No.: 16/482,835

(22) PCT Filed: Feb. 2, 2018

(86) PCT No.: PCT/JP2018/003544
§ 371 (c)(1),
(2) Date: Aug. 1, 2019

(87) PCT Pub. No.: WO2018/143393
PCT Pub. Date: Aug. 9, 2018

(65) Prior Publication Data
US 2020/0195387 A1 Jun. 18, 2020

(30) Foreign Application Priority Data
Feb. 2, 2017 (JP) .............................. JP2017-017973

(51) Int. Cl.
| H04L 1/18 | (2006.01) |
| H04L 5/00 | (2006.01) |
| H04L 27/26 | (2006.01) |
| H04W 72/04 | (2009.01) |

(52) U.S. Cl.
CPC .......... *H04L 1/1854* (2013.01); *H04L 1/1812* (2013.01); *H04L 1/1861* (2013.01);
(Continued)

(58) Field of Classification Search
CPC ... H04L 1/1854; H04L 1/1812; H04L 1/1861; H04L 5/0055; H04L 27/2678; H04L 72/0413
(Continued)

(56) References Cited

U.S. PATENT DOCUMENTS

2013/0114501 A1 5/2013 Kishiyama et al.
2014/0301324 A1 10/2014 Cheng et al.
(Continued)

FOREIGN PATENT DOCUMENTS

CN 105490781 A 4/2016
EP 3389208 A1 10/2018
(Continued)

OTHER PUBLICATIONS

Extended European Search Report issued in counterpart European Patent Application No. 18748282.3, dated Dec. 14, 2020 (9 pages).
(Continued)

*Primary Examiner* — Ricky Q Ngo
*Assistant Examiner* — Ellen A Kirillova
(74) *Attorney, Agent, or Firm* — Osha Bergman Watanabe & Burton LLP

(57) ABSTRACT

The present invention is designed so that UL control information can be reported properly in future radio communication systems. A user terminal includes a generation section that generates a UL signal using a resource that is associated with presence or absence of a scheduling request (SR), and a transmission section that transmits the UL signal.

11 Claims, 25 Drawing Sheets

(52) U.S. Cl.
CPC ........ *H04L 5/0055* (2013.01); *H04L 27/2678* (2013.01); *H04W 72/0413* (2013.01)

(58) Field of Classification Search
USPC .......................................................... 370/329
See application file for complete search history.

(56) References Cited

U.S. PATENT DOCUMENTS

2017/0041923 A1* 2/2017 Park ..................... H04L 1/1671
2019/0342135 A1* 11/2019 Kwak ................... H04L 5/0053

FOREIGN PATENT DOCUMENTS

| JP | 2012065298 A | 3/2012 |
|---|---|---|
| WO | 2011/118167 A1 | 9/2011 |

OTHER PUBLICATIONS

NTT Docomo, Inc.; "DMRS-based vs. Sequence-based PUCCH in short duration"; 3GPP TSG RAN WG1 Meeting #88, R1-1702811; Athens, Greece; Feb. 13-17, 2017 (9 pages).

NTT Docomo, Inc.; "Sequence-based PUCCH for UCI of up to 2 bits"; 3GPP TSG RAN WG1 Meeting #89, R1-1708470; Hangzhou, P.R. China; May 15-19, 2017 (8 pages).

LG Electronics; "Design of one-symbol UL control channel for NR"; 3GPP TSG RAN WG1 Meeting #87, R1-1611842; Reno, USA; Nov. 14-18, 2016 (4 pages).

LG Electronics; "sPUCCH design for HARQ-ACK feedback with shortened TTI length"; 3GPP TSG RAN WG1 Meeting #86, R1-166860; Gothenburg, Sweden; Aug. 22-26, 2016 (7 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

International Search Report issued in corresponding International Application No. PCT/JP2018/003544; dated Apr. 17, 2018 (1 page).

Written Opinion of the International Searching Authority issued in corresponding International Application No. PCT/JP2018/003544; dated Apr. 17, 2018 (3 pages).

Office Action issued in counterpart Chinese Application No. 201880019405.6 dated Oct. 11, 2021 (11 pages).

Office Action issued in the counterpart Indian Patent Application No. 201937031469, dated Dec. 16, 2021 (5 pages).

* cited by examiner

SEQUENCE TYPE 1

SEQUENCE TYPE 0

ALT. 1

| NUMBER OF TRANSMISSION PRBS X | NUMBER OF AMOUNTS OF PHASE ROTATION |
|---|---|
| 2 | 12 |
| 6 | 12 |
| 12 | 12 |
| 24 | 12 |

ALT. 2

| NUMBER OF TRANSMISSION PRBS X | NUMBER OF AMOUNTS OF PHASE ROTATION |
|---|---|
| 2 | 12 |
| 6 | 12 |
| 12 | 24 |
| 24 | 48 |

ALT. 3

| NUMBER OF TRANSMISSION PRBS X | NUMBER OF AMOUNTS OF PHASE ROTATION |
|---|---|
| 2 | 12 |
| 6 | 36 |
| 12 | 72 |
| 24 | 144 |

ALT. 4

| NUMBER OF TRANSMISSION PRBS X | NUMBER OF AMOUNTS OF PHASE ROTATION |
|---|---|
| 2 | 24 |
| 6 | 72 |
| 12 | 144 |
| 24 | 288 |

FIG. 15

| NACK-NACK | 00 |
| :---: | :---: |
| NACK-ACK | 01 |
| ACK-ACK | 11 |
| ACK-NACK | 10 |

FIG. 18

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+(plus)," "NR (New Radio)," "NX (New radio access)," "FX (Future generation radio access)," "LTE Rel. 13," "LTE Rel. 14," "LTE Rel. 15" or later versions) are under study.

In existing LTE systems (for example, LTE Rel. 8 to 13), downlink (DL) and/or uplink (UL) communication are performed using one-ms subframes (also referred to as "transmission time intervals (TTIs)" and so on). These subframes are the time unit for transmitting one channel-encoded data packet, and serve as the unit of processing in, for example, scheduling, link adaptation, retransmission control (HARQ (Hybrid Automatic Repeat reQuest)) and so on.

Also, in existing LTE systems (for example, LTE Rel. 8 to 13), a user terminal (UE (User Equipment)) transmits uplink control information (UCI) by using a UL control channel (for example, PUCCH (Physical Uplink Control CHannel)) and/or a UL data channel (for example, PUSCH (Physical Uplink Shared CHannel)). The format of this UL control channel is referred to as "PUCCH format" and so on.

UCI includes at least one of a scheduling request (SR), retransmission control information in response to DL data (DL data channel (PDSCH (Physical Downlink Shared CHannel))) (also referred to as "HARQ-ACK (Hybrid Automatic Repeat reQuest-Acknowledgement)," "ACK," "NACK (Negative ACK)" and so on) and channel state information (CSI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, 5G, NR, etc.) are expected to realize various radio communication services so as to fulfill mutually varying requirements (for example, ultra-high speed, large capacity, ultra-low latency, etc.).

For example, NR is under study to provide radio communication services referred to as "eMBB (enhanced Mobile Broad Band)," "mMTC (massive Machine Type Communication)," "URLLC (Ultra Reliable and Low Latency Communications)," and so on.

Furthermore, in LTE/NR, studies are underway to use UL control channels of various formats (UL control channel formats). When applying UCI transmission methods in existing LTE systems (LTE Rel. 13 or earlier versions) to such future radio communication systems, there is a risk that the coverage, throughput and/or others may deteriorate.

The present invention has been made in view of the above, and it is therefore an object of the present invention to provide a user terminal and a radio communication method, whereby UL control information can be reported properly in future radio communication systems.

Solution to Problem

A user terminal, according to an aspect of the present invention, has a generation section that generates a UL signal using a resource that is associated with presence or absence of a scheduling request (SR), and a transmission section that transmits the UL signal.

Advantageous Effects of Invention

According to the present invention, UL control information can be reported properly in future radio communication systems.

BRIEF DESCRIPTION OF DRAWINGS

FIG. 15 is a diagram to show an example of the configuration of the number of amounts of phase rotation for PUCCH bandwidth;

FIG. 18 is a diagram to show examples of values of UCI;

DESCRIPTION OF EMBODIMENTS

Figure 1A:
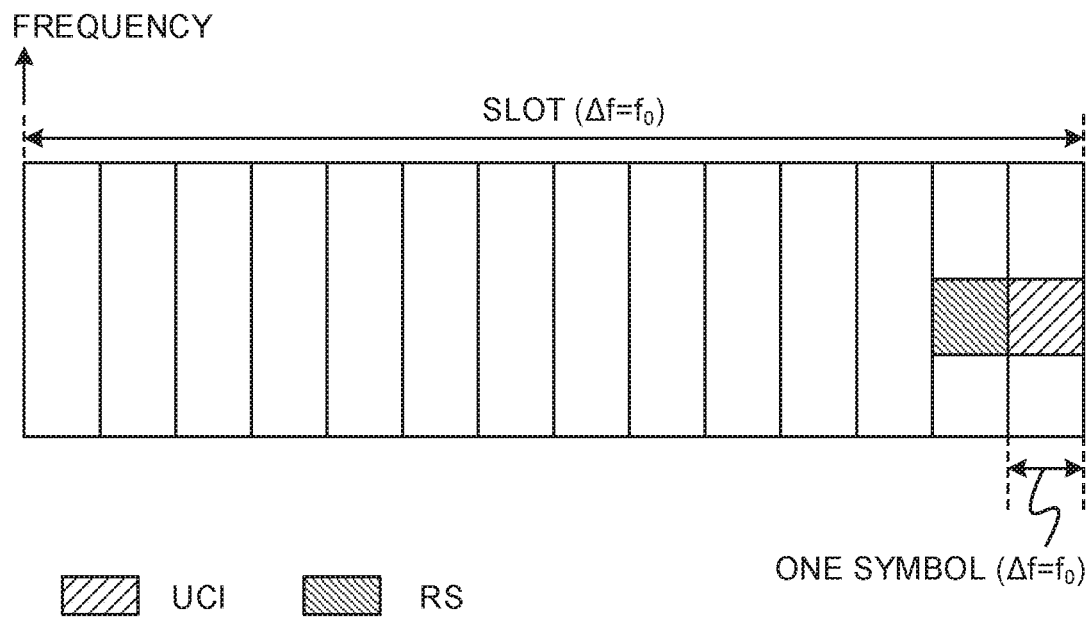
FIGS. 1A and 1B are diagrams, each showing an example of a short PUCCH format in future radio communication systems.

Future radio communication systems (for example, LTE Rel. 14, 15 and/or later versions, 5G, NR, etc.) are under study to introduce multiple numerologies, not a single numerology.

Note that a numerology may refer to a set of communication parameters that characterize the design of signals in a given RAT (Radio Access Technology), the design of a RAT and so on, or may refer to a parameter that relates to the frequency direction and/or the time direction, such as subcarrier spacing (SCS), symbol duration, cyclic prefix duration, subframe duration and so on.

Also, future radio communication systems are being studied to introduce time units (also referred to as "subframes," "slots," "minislots," "subslots," "transmission time intervals (TTIs)," "short TTIs," "radio frames" and so on) that are the same and/or different than existing LTE systems (LTE Rel. 13 or earlier versions), while supporting multiple numerologies and so on.

Note that TTIs may represent time units in which transport blocks, code blocks and/or codewords of transmitting/receiving data are transmitted and received. When a TTI is provided, the period of time (for example, the number of symbols) in which transport blocks, code blocks and/or codewords are actually mapped may be shorter than the TTI.

For example, when a TTI is formed with a given number of symbols (for example, fourteen symbols), transport blocks, code blocks and/or codewords of transmitting/receiving data can be transmitted and received in one or a given number of symbol periods among these. If the number of symbols in which transport blocks, code blocks and/or codewords of transmitting/receiving data are transmitted/received is smaller than the number of symbols constituting the TTI, reference signals, control signals and so on can be mapped to symbols in the TTI where no data is mapped.

Subframes may serve as time units that have a given time duration (for example, 1 ms), irrespective of which numerologies are used by (and/or configured in) user terminals (for example, UE (User Equipment)).

By contrast with this, slots may serve as time units that depend on numerologies used by UEs. For example, if the subcarrier spacing is 15 kHz or 30 kHz, the number of symbols per slot may be seven or fourteen. When the subcarrier spacing is 60 kHz or greater, the number of symbols per slot may be fourteen. In addition, a slot may include a plurality of minislots (subslots).

Generally, subcarrier spacing and symbol duration hold a reciprocal relationship. Therefore, as long as the number of symbols per slot (or minislot (subslot)) is the same, the higher (wider) the subcarrier spacing, the shorter the slot length, and the lower (narrower) the subcarrier spacing, the longer the slot length. Note that "subcarrier spacing is high" may be paraphrased as "subcarrier spacing is wide," and "subcarrier spacing is low" may be paraphrased as "subcarrier spacing is narrow."

For such future radio communication systems, a study is in progress to support a UL control channel (hereinafter also referred to as a "short PUCCH") that is structured to be shorter in duration than PUCCH (Physical Uplink Control CHannel) formats for existing LTE systems (for example, LTE Rel. 8 to 13) and/or a UL control channel (hereinafter also referred to as a "long PUCCH") that is structured to have a longer duration than the above short duration.

A short PUCCH (also referred to as a "shortened PUCCH") is formed with a given number of symbols (for example, one symbol or two symbols) of a given SCS. In this short PUCCH, uplink control information (UCI) and a reference signal (RS) may be time-division-multiplexed (TDM (Time Division Multiplexing)) or frequency-division-multiplexed (FDM (Frequency Division Multiplexing)). The RS may be, for example, the demodulation reference signal (DMRS (DeModulation Reference Signal)), which is used to demodulate UCI.

The SCS for each symbol of the short PUCCH may be the same as or higher than the SCS for symbols of data channels (hereinafter also referred to as "data symbols"). The data channels may be, for example, a downlink data channel (PDSCH (Physical Downlink Shared CHannel)), an uplink data channel (PUSCH (Physical Uplink Shared CHannel)) and so on.

A short PUCCH may be referred to as a "PUCCH with a higher (bigger, wider, etc.) SCS" (for example, 60 kHz). Note that the time unit in which one short PUCCH is transmitted may be referred to as a "short TTI."

In a short PUCCH, a multicarrier waveform (for example, a waveform based on cyclic prefix OFDM (CP-OFDM (Cyclic Prefix Orthogonal Frequency Division Multiplexing))) may be used, or a single-carrier waveform (for example, a waveform based on DFT-S-OFDM (Discrete Fourier Transform Spread Orthogonal Frequency Division Multiplexing)) may be used.

Note that the waveform may be referred to as "communication scheme," "multiplexing scheme," "modulation scheme," "access scheme," "waveform scheme," and so on. Also, these waveforms may be characterized based on whether or not DFT precoding (spreading) is applied to the OFDM waveform. For example, CP-OFDM may be referred to as the "waveform (signal) to which DFT precoding is not applied," and DFT-S-OFDM may be referred to as the "waveform (signal) to which DFT precoding is applied." Furthermore, a "waveform" may also be referred to as "waveform signal," "signal in accordance with waveform," "waveform of signal," "signal," and so on.

Figure 1B:
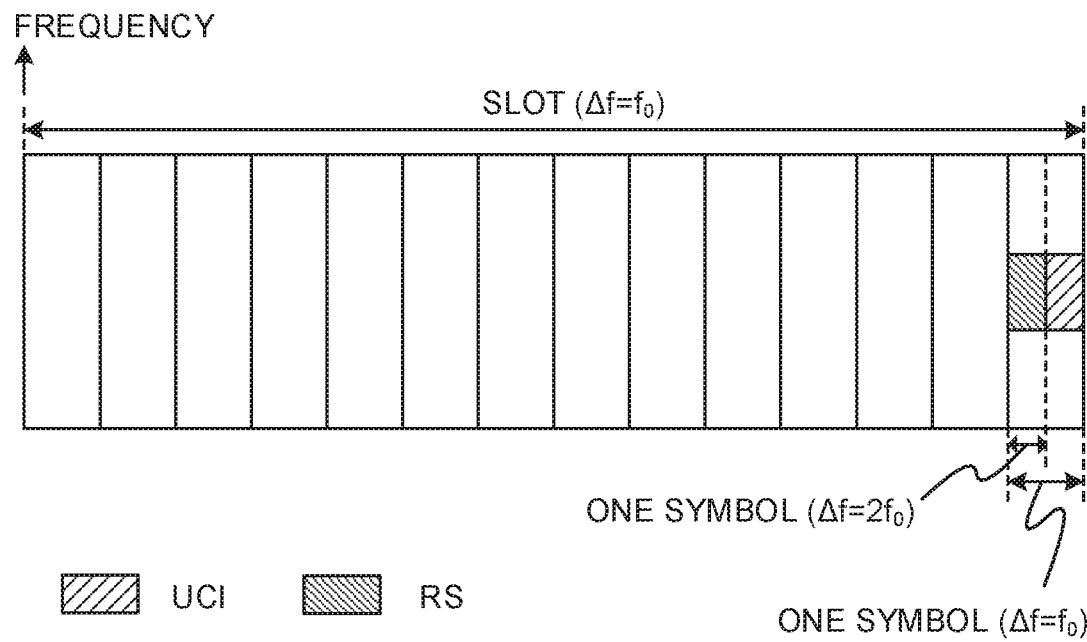

FIGS. 1A and 1B are diagrams, each showing an example of a short PUCCH format for use in future radio communication systems. In these examples, one slot is formed with fourteen symbols, each having a subcarrier spacing of $\Delta f=f_0$ (for example, 15 kHz), but the number of symbols to be included in one slot is by no means limited to this.

In FIGS. 1A and 1B, a short PUCCH is placed (mapped) in a given number of symbols (here, one symbol or two symbols) from the end of the slot. In addition, a short PUCCH is placed in one or more frequency resources (for example, one or more physical resource blocks (PRBs)).

As shown in FIG. 1A, in a short PUCCH, UCI and an RS may be time-division-multiplexed (TDM) in a plurality of symbols. In this short PUCCH, the UCI and the RS are arranged in different symbols. A multicarrier waveform (for example, the OFDM waveform) or a single-carrier waveform (for example, the DFT-S-OFDM waveform) can be applied to this short PUCCH.

Meanwhile, as shown in FIG. 1B, in a short PUCCH, UCI and an RS may be time-division-multiplexed (TDM) over a plurality of symbols having a higher SCS (for example, 2 $f_0$) than the SCS($=f_0$) constituting the slot. In this case, within one symbol (which may be referred to as, for example, a "long symbol") in the slot, multiple symbols (which may be referred to as, for example, "short symbols") with a higher SCS can be placed. In this short PUCCH, UCI and an RS are arranged in different short symbols. A multicarrier waveform (for example, the OFDM waveform) or a single-carrier waveform (for example, the DFT-s-OFDM) can be applied to this short PUCCH.

Also, in one or more symbols in a short PUCCH, UCI and an RS may be frequency-division-multiplexed (FDM). In this short PUCCH, UCI and an RS may be arranged in different frequency resources (for example, PRBs, resource units, resource elements, subcarriers, etc.). In this case, if a single-carrier waveform is applied to the short PUCCH, there is a possibility that the peak-to-average power ratio (PAPR) may increase, so that a multicarrier waveform is preferable.

Note that, although FIGS. 1A and 1B each show an example in which a short PUCCH is mapped to the second symbol from the end of a slot and/or the last symbol, the short PUCCH is by no means limited to this location. For example, a given number of symbols at the beginning or in the middle of the slot may serve as symbols for arranging the short PUCCH.

Meanwhile, a long PUCCH is arranged over a plurality of symbols in the slot so as to improve the coverage over the short PUCCH. In this long PUCCH, UCI and an RS (for example, the DMRS) may be time-division-multiplexed (TDM) or frequency-division-multiplexed (FDM). A long PUCCH may be referred to as a "PUCCH with a lower (smaller, narrower, etc.) SCS" (for example, 15 kHz). Note that the time unit in which one long PUCCH is transmitted may be referred to as a "long TTI."

A long PUCCH may be comprised of a number of frequency resources to match a short PUCCH, or a long PUCCH may be formed with a smaller number of frequency resources (for example, one or two PRBs) than a short PUCCH, in order to achieve a power boosting effect. Also, a long PUCCH may be placed with a short PUCCH in the same slot.

For a long PUCCH, a single-carrier waveform (for example, DFT-s-OFDM waveform) may be used, or a multicarrier waveform (for example, OFDM waveform) may be used. In addition, a long PUCCH may be applied frequency hopping per given period within a slot (for example, per mini (sub) slot).

Note that a long PUCCH may be a PUCCH that is different from the PUCCHs (PUCCHs of different formats) stipulated in existing LTE systems (for example, LTE Rel. 8 to 13).

Figure 2A:
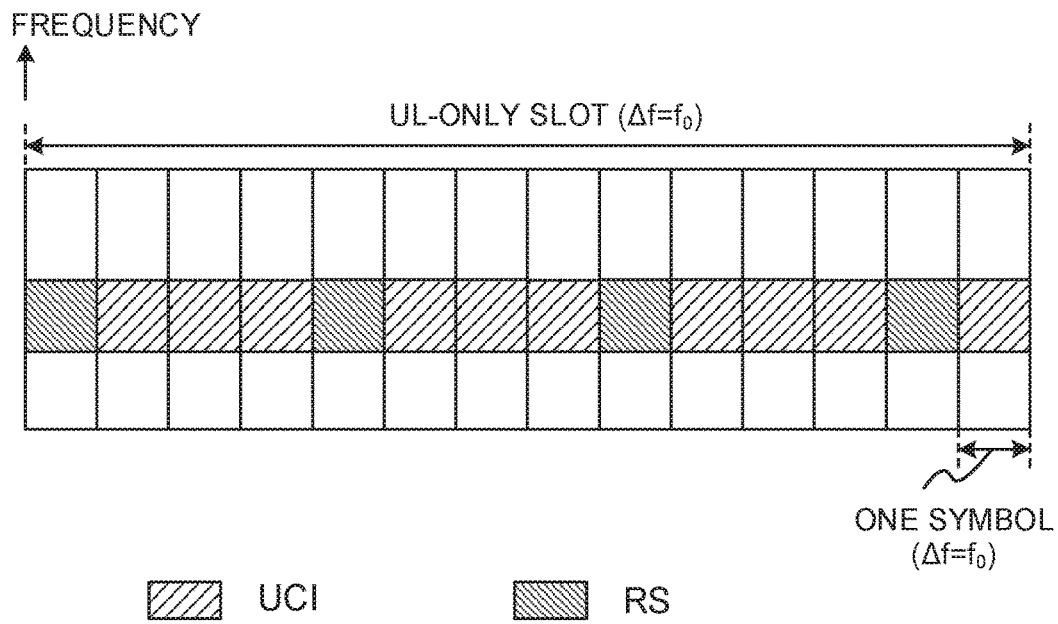
FIGS. 2A and 2B are diagrams, each showing an example of a long PUCCH format in future radio communication systems.
Figure 2B:
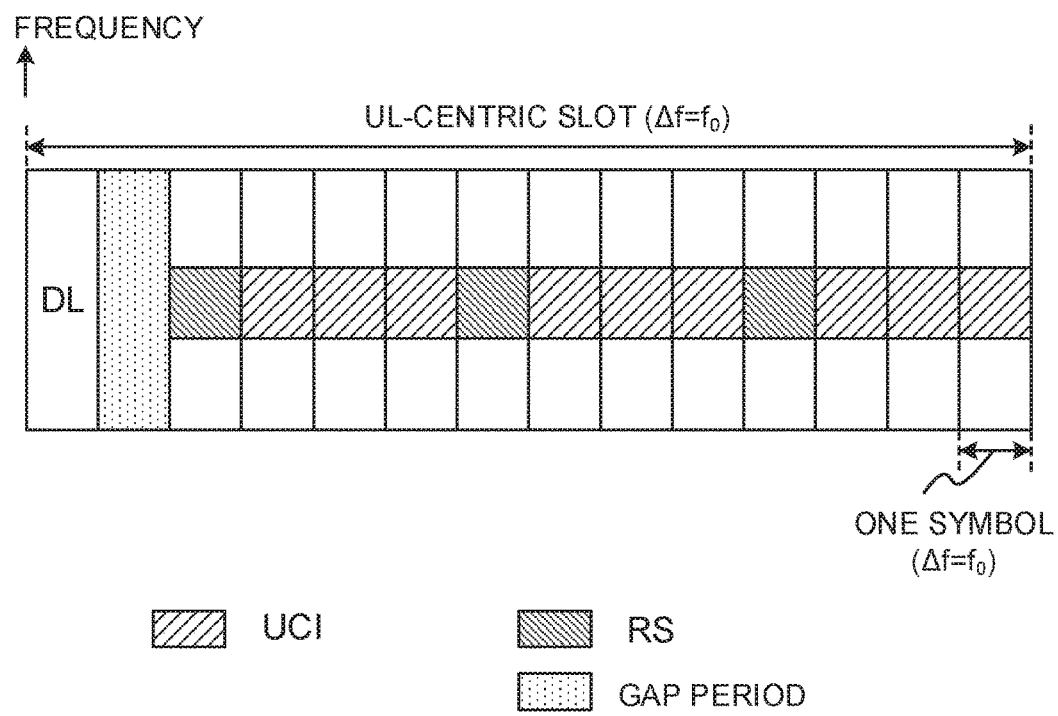

FIGS. 2A and 2B are diagrams, each showing an example of a long PUCCH format in future radio communication systems. In these examples, one slot is formed with fourteen symbols, each having a subcarrier spacing of $\Delta f=f_0$ (for example, 15 kHz), but the number of symbols to be included in one slot is by no means limited to this.

FIG. 2A shows an example of a slot (UL-only slot), in which a UL signal (for example, PUSCH and/or PUCCH) are transmitted/received, and FIG. 2B shows an example of a slot (UL-centric slot), in which a DL signal (for example, PDCCH) is transmitted and received in a given number of symbols (here, the first one symbol), a symbol (gap period) for switching between DL and UL is provided, and a UL signal (for example, PUSCH and/or PUCCH) are transmitted and received in the rest of the symbols. Note that the slots where a long PUCCH can be applied are by no means limited to UL-only slots and/or UL-centric slots.

In the UL-only slot shown in FIG. 2A, a long PUCCH is arranged over all of the fourteen symbols in the slot. In the short PUCCH shown in FIG. 2A, UCI is mapped over a plurality of UCI symbols (here, ten symbols) by using at least one of spreading, repetition and coding.

In the UL-centric slot of FIG. 2B, a long PUCCH is placed over twelve symbols for UL signal in the slot. In the short PUCCH shown in FIG. 2B, UCI is mapped over multiple UCI symbols (here, nine symbols) by using at least one of spreading, repetition and coding.

Hereinafter, a "PUCCH," when simply mentioned so, may be read as "a short PUCCH and/or a long PUCCH."

The PUCCH may be time-division-multiplexed (TDM) and/or frequency-division-multiplexed (FDM) with a UL data channel (hereinafter also referred to as "PUSCH") in the slot. Also, the PUCCH may be time-division-multiplexed (TDM) and/or frequency-division-multiplexed (FDM) with a DL data channel (hereinafter also referred to as "PDSCH") and/or a DL control channel (hereinafter also referred to as "PDCCH (Physical Downlink Control CHannel)") within the slot.

As PUCCH transmission methods, DMRS-based transmission and sequence-based transmission will be described below.

DMRS-based transmission reports UCI in a PUCCH that includes the DMRS for demodulating UCI (DMRS-based PUCCH), and therefore DMRS-based transmission may be referred to as "coherent transmission," "coherent design," and so on.

Figure 3A:
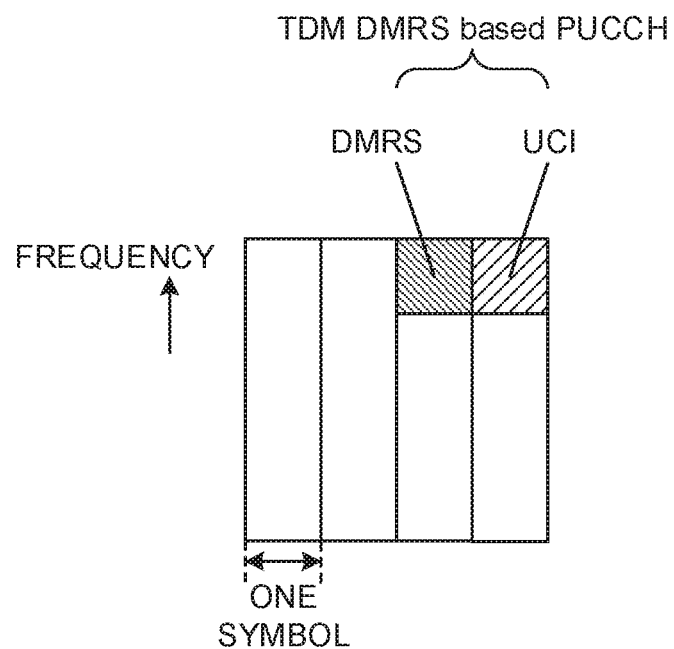
FIGS. 3A and 3B are diagrams to show examples of DMRS-based PUCCH.
Figure 3B:
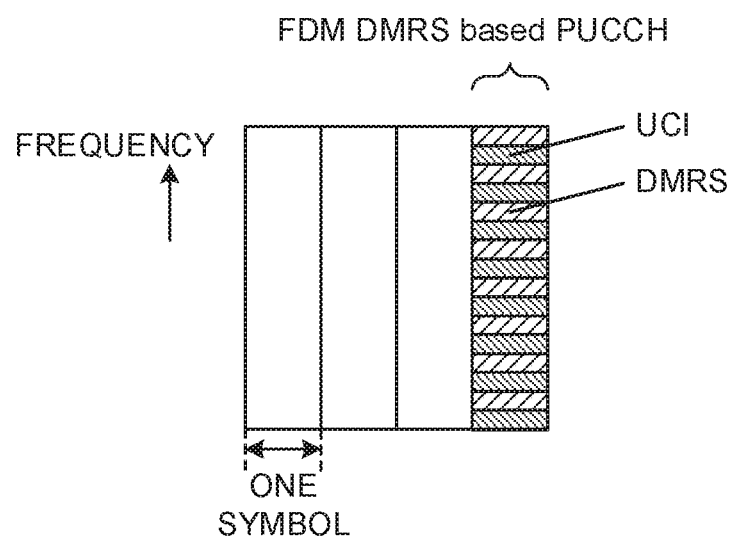

FIG. 3 provide diagrams to show examples of DMRS-based PUCCHs. A DMRS-based PUCCH may be a TDM DMRS-based PUCCH, or may be an FDM DMRS-based PUCCH. In the TDM DMRS-based PUCCH shown in FIG.

3A, DMRS and UCI are allocated and time-division-multiplexed (TDM) per symbol or per short symbol. In the FDM DMRS-based PUCCH shown in FIG. 3B, DMRS and UCI are allocated and frequency-division-multiplexed (FDM) per subcarrier.

In sequence-based transmission, UCI is reported in a PUCCH (sequence-based PUCCH) without an RS for demodulating the UCI, so that sequence-based transmission may be referred to as "non-coherent transmission," "non-coherent design" and/or the like.

For example, multiple candidates for a transmission resource for use for sequence-based transmission are associated, respectively, with multiple candidate values of the information that is reported (for example, UCI). The transmission resource may include a spreading code resource that can be code-division-multiplexed (CDM). For example, the spreading code resource may be at least one of a base sequence, the amount of phase rotation (cyclic shift), and an OCC (Orthogonal Cover Code).

Multiple candidates are provided from the network (for example, radio base station) to a UE. Information to represent multiple candidates may be reported from the network to the UE via higher layer signaling (for example, RRC (Radio Resource Control) signaling, MAC (Medium Access Control) signaling, broadcast information (the MIB (Master Information Block), SIBs (System Information Blocks), etc.), physical layer signaling (for example, DCI) or a combination of these.

The UE may select one resource from the multiple candidates, depending on the value of the UCI that is reported, and transmit the sequence-based PUCCH by using the selected resource.

Hereinafter, a case will be described in which the transmission resource for reporting UCI is the amount of phase rotation. Multiple candidate amounts of phase rotation that are assigned to one UE may be referred to as a "set of amounts of phase rotation." Although a case will be assumed here where the number of subcarriers, M, for use for a sequence-based PUCCH is twelve (in other words, a case where one PRB is used for a sequence-based PUCCH), this is by no means limiting.

The sequence length of a base sequence for use for a sequence-based PUCCH is determined by the number of subcarriers M and the number of PRBs. In this case, one PRB is assumed, so that the sequence length of a base sequences is 12 (=12×1). In this case, twelve amounts of phase rotation $\alpha_0$ to $\alpha_{11}$, provided at phase intervals of $2\pi/12$, are set forth. The twelve sequences, each obtained by applying phase rotation (cyclic shift) to a base sequence based on the amounts of phase rotation $\alpha_0$ to $\alpha_{11}$, are orthogonal to each other. Note that the amounts of phase rotation $\alpha_0$ to $\alpha_{11}$ may be defined based on at least one of the number of subcarriers M, the number of PRBs and the sequence length of the base sequence. The set of amounts of phase rotation may be comprised of two or more amounts of phase rotation that are selected from the amounts of phase rotation $\alpha_0$ to $\alpha_{11}$.

FIG. 4 provide diagrams to show examples of sets of amounts of phase rotation. The length of UCI here is two bits. Since two-bit UCI can assume four values, a set of amounts of phase rotation includes four amounts of phase rotation.

Figure 4B:
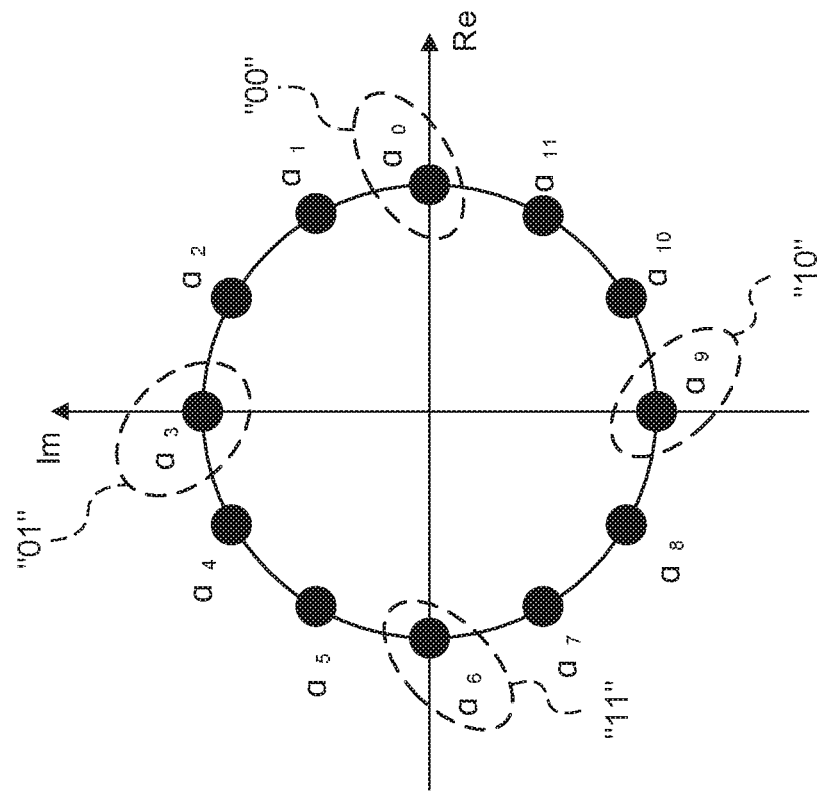
FIGS. 4A and 4B are diagrams to show examples of sets of amounts of phase rotation.
Figure 4A:
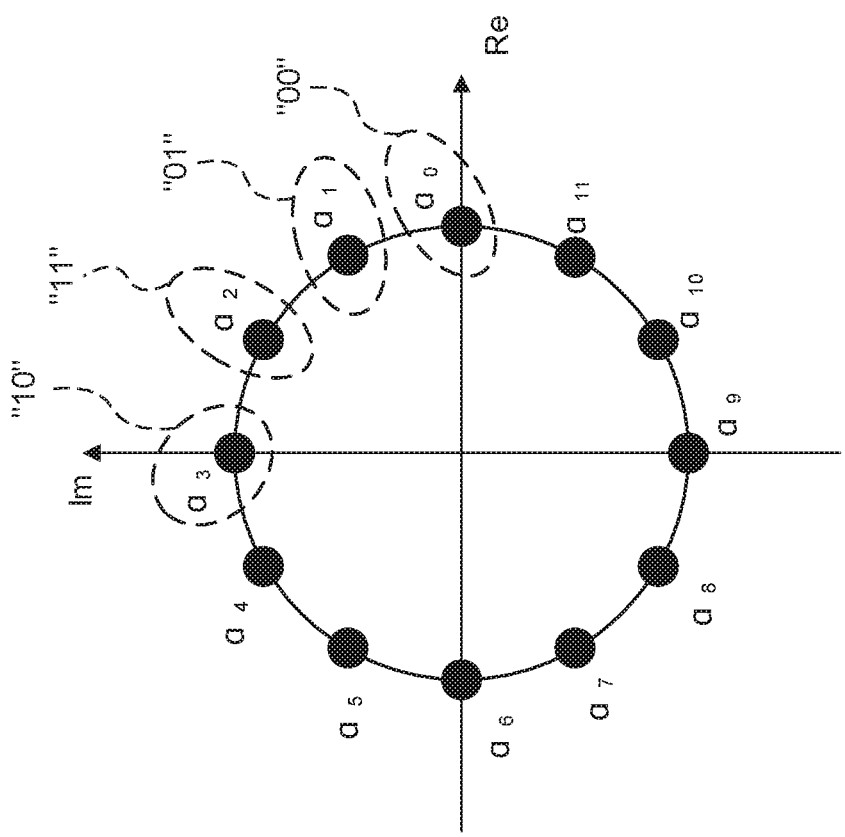

The set of amounts of phase rotation for sequence type 0 shown in FIG. 4A is comprised of a plurality of neighboring (continuous) amounts of phase rotation. This set of phase rotation amounts includes four amounts of phase rotation $\alpha_0$, $\alpha_1$, $\alpha_2$ and $\alpha_3$, each spaced apart by $\pi/6$. The set of amounts of phase rotation for sequence type 1 shown in FIG. 4B is comprised of a plurality of amounts of phase rotation that are apart from each other. In this phase rotation amount set, the gap between two neighboring amounts of phase rotation is the greatest, and four amounts of phase rotation $\alpha_0$, $\alpha_3$, $\alpha_6$ and as, each spaced apart by $\pi/2$, are included.

In an environment that is little frequency-selective, the cross correlation is insignificant with both sequence type 0 and sequence type 1 (there is no interference between sequences generated from each sequence type). Therefore, in an environment with low frequency selectivity, sequence type 0 and sequence type 1 have an equal UCI error rate. When sequence type 0 is used, twelve amounts of phase rotation can be provided more densely, so that three UEs can each use four amounts of phase rotation, allowing more efficient use of amounts of phase rotation.

On the other hand, in an environment that is strongly frequency-selective, there is significant cross correlation between sequences that are generated by applying neighboring phase rotation amounts, so that there are more UCI errors. Therefore, when the frequency selectivity is strong, using sequence type 1 can lower the UCI error rate compared to using sequence type 0.

The UE may assume using sequence type 0 if the transmission bandwidth allocated to a PUCCH is equal to or greater than a given value, and selecting sequence type 1 if the transmission bandwidth allocated to a PUCCH is less than the given value. By this means, without reporting the sequence type from the network, the UE can select a sequence type that fulfills a given error rate. A case will be assumed here where, as the transmission bandwidth increases, the amounts of phase rotation that can be used increase, and where, nevertheless, not all of these are used. For example, if the amounts of phase rotation that can be used are limited to twelve regardless of the transmission bandwidth and the transmission bandwidth is six PRBs, 12×6=72 amounts of phase rotation can be used. Of these, only twelve amounts of phase rotation are used, so that, even when sequence type 0 is used, the intervals between the amounts of phase rotation match six amounts of phase rotation, and therefore the cross correlation between sequences that are generated based on neighboring amounts of phase rotation in the twelve amounts of phase rotation becomes insignificant.

Figure 5:
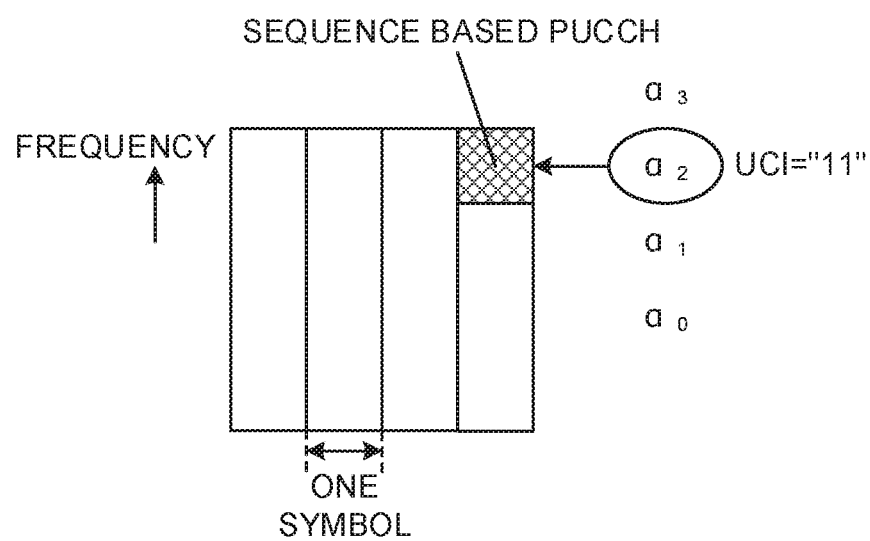
FIG. 5 is a diagram to show an example of a sequence-based PUCCH.

FIG. 5 is a diagram to show an example of a sequence-based PUCCH. When a UE, to which the set of amounts of phase rotation shown in FIG. 4A is assigned, reports "11" as two-bit UCI, the UE rotates the phase of the base sequence based on corresponding $\alpha_2$, and generates a transmission signal of the sequence-based PUCCH.

FIG. 6 provide diagrams, each showing an example of the process of generating sequence-based PUCCH transmission signals. In the transmission signal generation process, base sequences $X_0$ to $X_{M-1}$ having a sequence length of M are subjected to phase rotation (cyclic shift), using amounts of phase rotation $\alpha$ that are selected, and the base sequences that have been subjected to phase rotation are input to an OFDM transmitter or a DFT-S-OFDM transmitter. The UE transmits output signals from the OFDM transmitter or the DFT-S-OFDM transmitter.

Figure 6B:
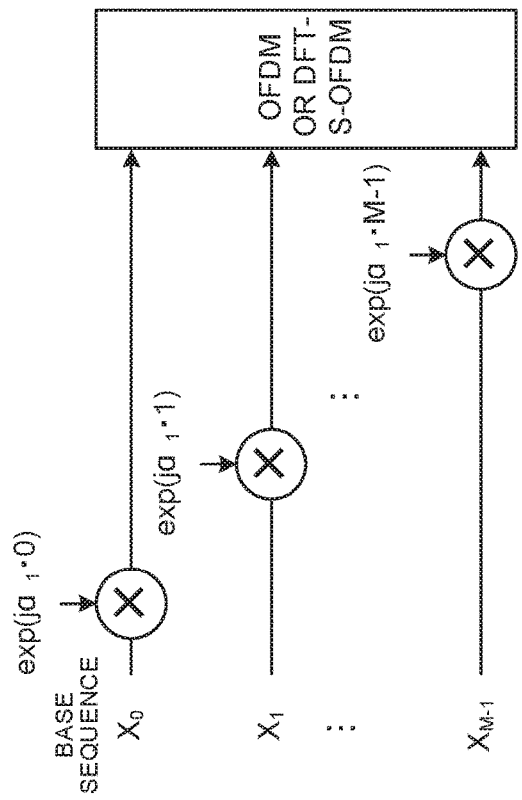
FIGS. 6A to 6D are diagrams to show examples of processes of generating sequence-based PUCCH transmission signals.
Figure 6D:
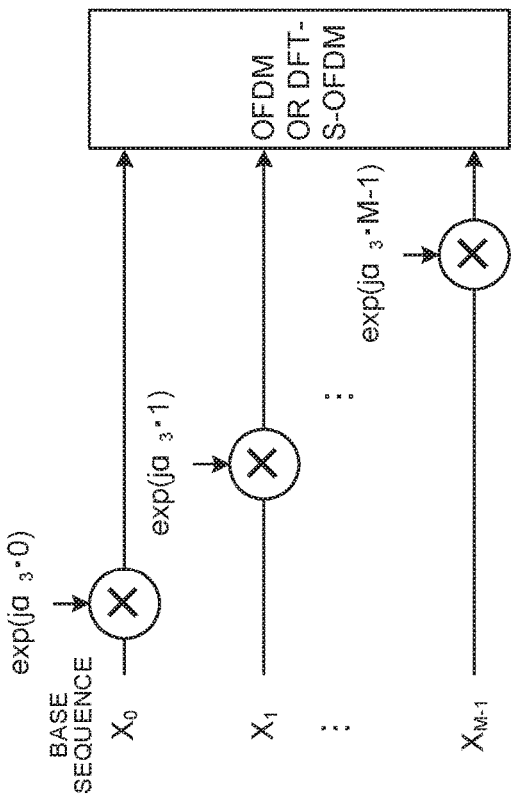
Figure 6A:
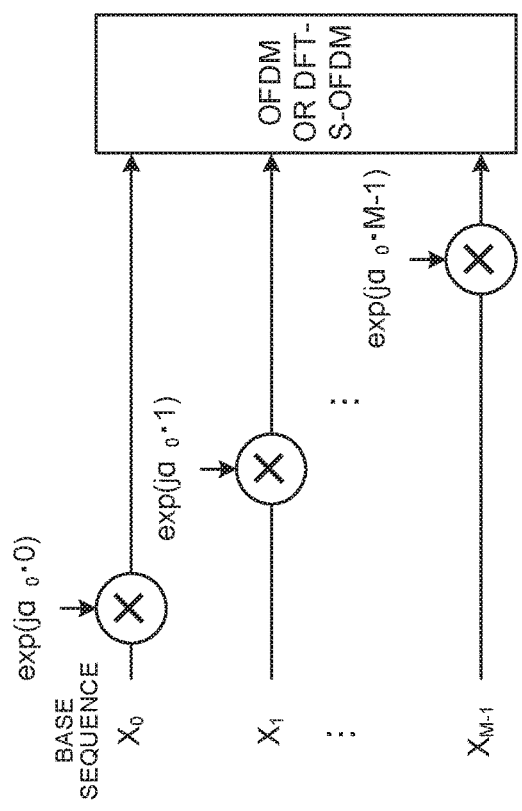
Figure 6C:
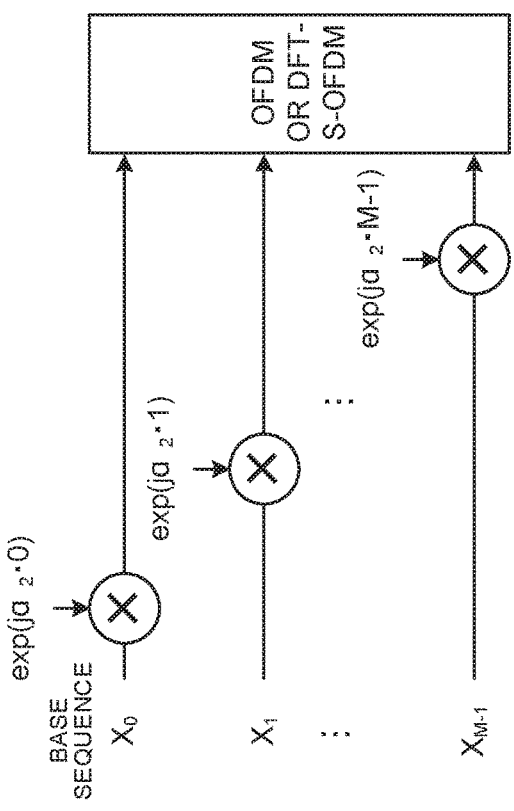

When the amounts of phase rotation $\alpha_0$ to $\alpha_3$ are associated, respectively, with information 0 to 3 of UCI, and information 0 is reported as UCI, as shown in FIG. 6A, the UE applies phase rotation to base sequences $X_0$ to $X_{M-1}$ by using phase rotation amount $\alpha_0$, which is associated with information 0. Similarly, when the UE reports information 1 to 3 as UCI, the UE applies phase rotation to base sequences $X_0$ to $X_{M-1}$ by using phase rotation amounts $\alpha_1$, $\alpha_2$ and $\alpha_3$, which are associated with information 1 to 3, as shown in FIGS. 6B, 6C and 6D, respectively.

When UCI is reported using such limited time/frequency resources, how to report SRs is the problem.

Therefore, the present inventors have studied the method of reporting SRs while preventing the error rate of UCI from deteriorating, and arrived at the present invention. According to one aspect of the present invention, UL signal is generated by using a resource that is associated with the presence or absence of scheduling requests (SRs), so that SRs can be reported while reducing the deterioration of the error rate of UL control information other than SRs.

Now, embodiments of the present invention will be described in detail below with reference to the accompanying drawings. Note that the radio communication methods according to these embodiments may be applied individually or may be applied in combination.

In each of the following embodiments, a "symbol" might mean a "symbol" (time resource) that assumes a given numerology (for example, a given SCS).

Also, UCI in each embodiment does not include SRs. UCI may include ACKs/NACKs, or may include CSI.

(Radio Communication Method)

First Embodiment

In accordance with a first embodiment of the present invention, a UE reports SRs by selecting time/frequency resources for a sequence-based PUCCH.

For example, the UE generates a sequence-based PUCCH transmission signal using a resource that is associated with the value of UCI. In addition, the UE maps the sequence-based PUCCH to a time/frequency resource that is associated with the presence or absence of SR.

Multiple candidates for the resource for reporting UCI (UCI-reporting resource) are associated with multiple candidate values of UCI, respectively. The multiple candidates for the UCI-reporting resource are, for example, multiple spreading code resources that are orthogonal to each other. In addition, two candidates for the resource for reporting an SR (SR-reporting resource) are associated with the presence and absence of SR, respectively. The two candidates for the SR-reporting resource are mutually different time/frequency resources, for example.

Information about multiple candidates of transmission resources (for example, the UCI-reporting resource and/or the SR-reporting resources) for the sequence-based PUCCH may be reported from the network to the UE by way of higher layer signaling and/or physical layer signaling. This allows the network to allocate transmission resources for the sequence-based PUCCH to multiple UEs.

The UE selects the UCI-reporting resource corresponding to the value of the UCI that is reported, from a plurality of candidates for the UCI-reporting resource, selects the SR-reporting resource corresponding to presence or absence of SR from among a plurality of candidates for the SR-reporting resource, and generates a transmission signal of the sequence-based PUCCH using the UCI-reporting resource and the SR-reporting resource that are selected.

Figure 7A:
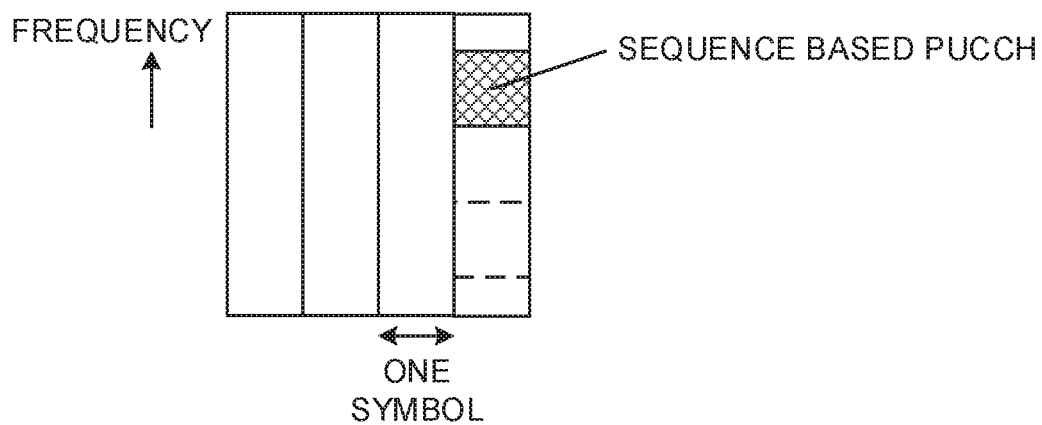
FIGS. 7A and 7B are diagrams to show examples of sequence-based PUCCHs according to a first embodiment of the present invention.
Figure 7B:
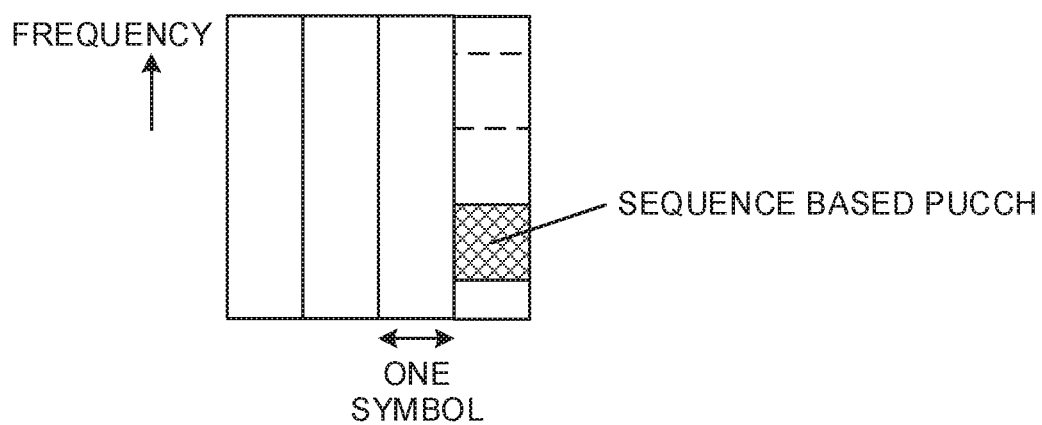

FIG. 7 provide diagrams to show examples of sequence-based PUCCHs according to the first embodiment. Here, the frequency resources of FIG. 7A corresponding to the case with an SR, and the frequency resources of FIG. 7B for the case without an SR are assigned to a UE. The UE selects a frequency resource based on the presence or absence of SR, and maps the sequence-based PUCCH to the selected frequency resource. Furthermore, the UE generates a transmission signal of the sequence-based PUCCH to match the UCI value.

"With SR" may be rephrased as "positive SR," and "without SR" may be rephrased as "negative SR."

If there is no SR and there is no UCI to report, the UE may use the spreading code resource corresponding to the UCI value "00" and the frequency resource for the case without an SR to transmit the sequence-based PUCCH.

Two time resources corresponding to the presence and absence of SR, respectively, may be allocated to the UE, and the UE may select between the time resources depending on the presence or absence of SR.

Note that, since two candidates for the SR-reporting resource are allocated to one UE, twice as much time/frequency resources are required compared to the case where SR is not reported.

According to the first embodiment described above, SRs can be reported without increasing spreading code resources for a sequence-based PUCCH.

Second Embodiment

According to a second embodiment of the present invention, a UE reports an SR by selecting the spreading code resource for use for a sequence-based PUCCH.

The UE generates a sequence-based PUCCH transmission signal using a spreading code resource that is associated with the combination of the value of UCI and the presence or absence of SR.

Multiple candidates for the spreading code resource are associated, respectively, with multiple candidate values of the combination of the UCI value and the presence or absence of SR. Information to represent the multiple candidates may be reported from the network to the UE via higher layer signaling and/or physical layer signaling.

In the example shown here, two-bit UCI is reported.

Figure 8B:
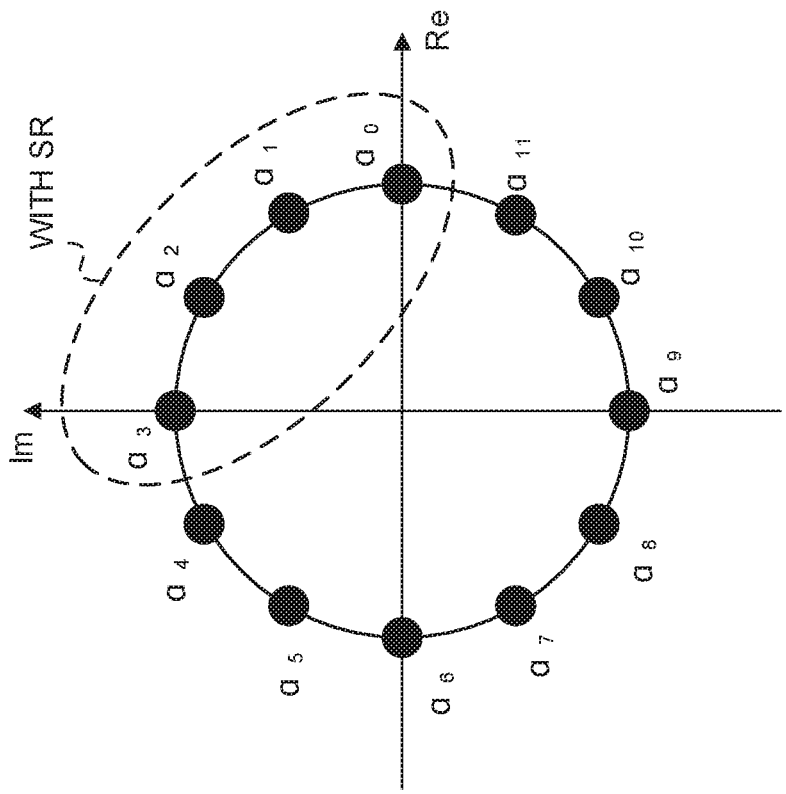
FIGS. 8A and 8B are diagrams to show multiple candidates for spreading code resources in the event the presence or absence of SR are associated with base sequences.
Figure 8A:
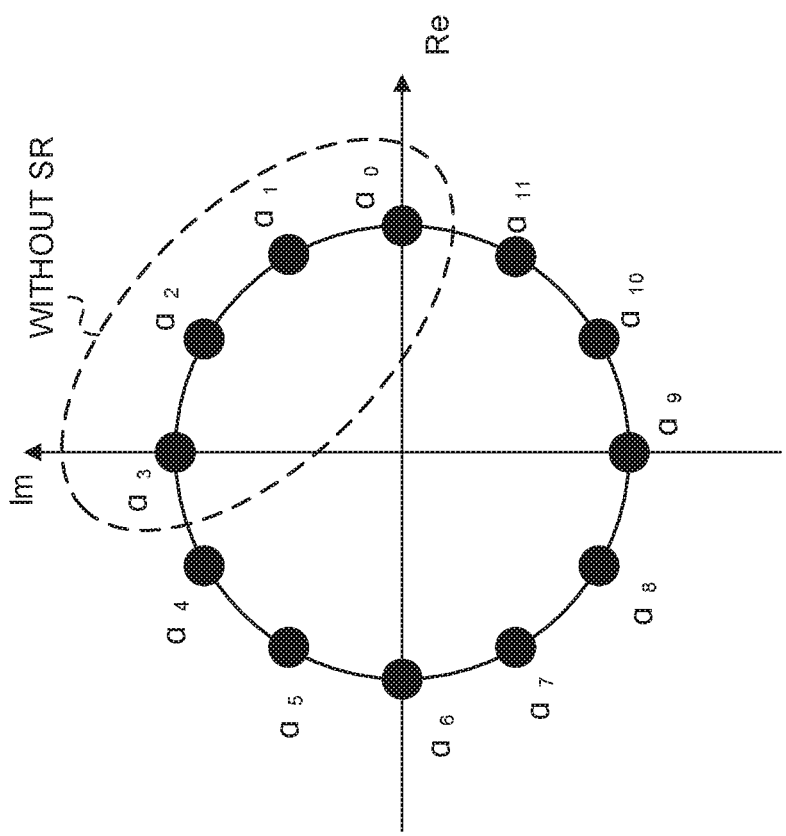

FIG. 8 provide diagrams to show multiple candidates of spreading code resources in the event the presence or absence of SR is associated with the base sequence. Two base sequences corresponding to presence and absence of SR are assigned to the UE, and four amounts of phase rotation, corresponding to values of UCI, are assigned to the UE. As shown in FIG. 8A, the base sequence for the case where SR is absent is the base sequence of a sequence index (n), and $\alpha_0$ to $\alpha_3$ are amounts of phase rotation that correspond to UCI values. As shown in FIG. 8B, the base sequence corresponding to the case where SR is present is a base sequence of a sequence index (n+1), and $\alpha_0$ to $\alpha_3$ are amounts of phase rotation that correspond to UCI values. The UE selects the base sequence based on the presence or absence of SR, and selects the amount of phase rotation depending on the value of the UCI.

Although FIG. 8 show cases where the assignment of amounts of phase rotation is equal between the case where SR is present and the case where SR is absent, the amounts of phase rotation may be different between the case where SR is present and the case where SR is absent. This allows the network to assign the amounts of phase rotation to the UE more flexibly. Meanwhile, by assigning the same amounts of phase rotation when there is an SR and when there is no SR, it is possible to reduce the number of information bits for reporting the amount of phase rotation compared to the case where the amount of phase rotation is different when there is an SR and when there is no SR.

Figure 9:
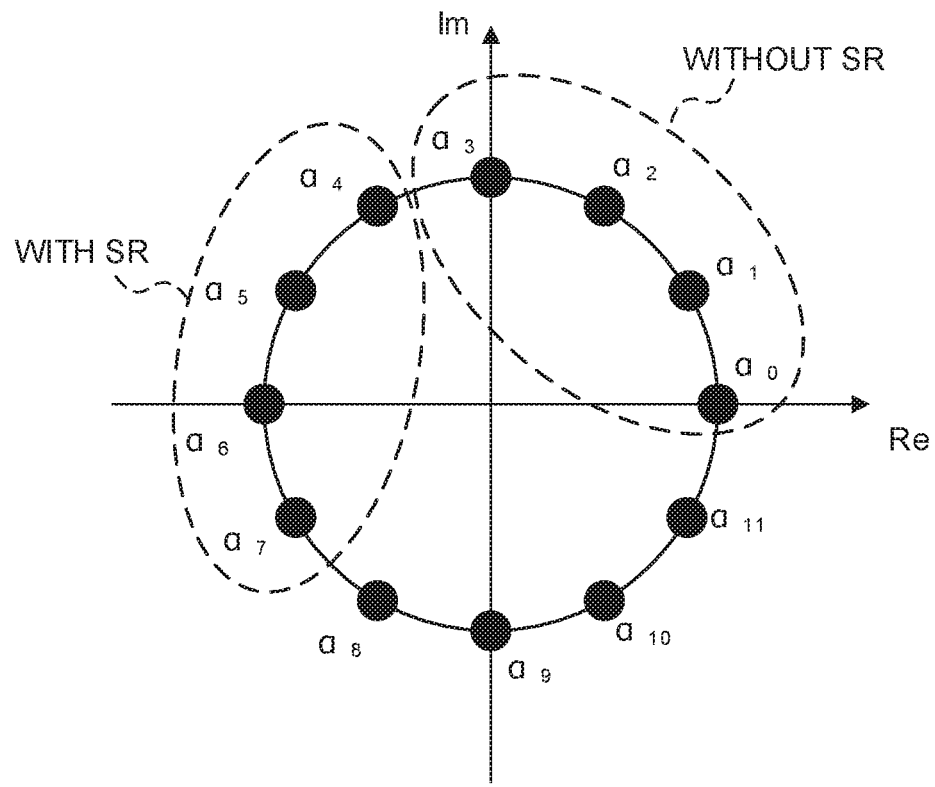
FIG. 9 is a diagram to show multiple candidates for spreading code resources in the event combinations of the presence or absence of SR and UCI values are associated with amounts of phase rotation.

FIG. 9 is a diagram to show multiple candidates for a spreading code resource in the event the combination of the presence or absence of SR and UCI values are associated with amounts of phase rotation. Eight amounts of phase rotation that correspond to combinations of the presence and absence of SR and UCI values are assigned to the UE. $\alpha_0$ to $\alpha_3$ are the amounts of phase rotation for the case where SR is absent, and $\alpha_4$ to $\alpha_7$ are the amounts of phase rotation for the case where SR is present. The UE selects the amount of phase rotation based on the presence or absence of SR and the value of UCI.

If there is no SR and there is no UCI, the UE may generate a transmission signal of the sequence-based PUCCH using the amount of phase rotation corresponding to the UCI value "00."

Note that, since the presence or absence of SR is reported in addition to the value of UCI, twice as much spreading code resources are required compared to the case where SR is not reported.

Only the spreading code resource corresponding to one of the presence and the absence of SR may be reported to the UE, and the UE may identify the spreading code resource corresponding to the other one based on a given rule. For example, if the resource index (which is, for example, a sequence index, a phase rotation amount index, etc.) to indicate the spreading code resource for the case where SR is absent is reported to the UE, the UE may determine the value obtained by adding z, which is provided in advance, to the resource index that is reported, as the resource index for when SR is present.

In the examples of FIG. 8, the resource index is a sequence index. If z is 1 and the sequence index for when SR is absent is n, the UE obtains n+1 from n as the sequence index for when SR is present.

In the example of FIG. 9, the resource index is a phase rotation amount index. If z is 4 and the phase rotation amount index for when SR is absent is p, the UE obtains p+4 from p as the phase rotation amount index for when SR is present. That is, if $\alpha_p$ is the amount of phase rotation in the case an SR is absent, $\alpha_{p+4}$ is obtained as the amount of phase rotation for when SR is present.

By this means, it is possible to reduce the amount of information for reporting candidates for the spreading code resource from the network to the UE.

According to the second embodiment described above, an SR can be reported without increasing the time/frequency resources for a sequence-based PUCCH.

Third Embodiment

According to a third embodiment of the present invention, two spreading code resources with high cross-correlation are assigned to the presence and absence of SR. For example, these two spreading code resources with high cross-correlation may be two neighboring amounts of phase rotation, or two neighboring base sequences.

If a channel is strongly frequency-selective, the correlation between two sequences that are generated from two neighboring amounts of phase rotation, respectively, may be high (orthogonality is lost). Therefore, using all amounts of phase rotation may result in an increased error rate. The maximum of twelve amounts of phase rotation can be used for a PUCCH for LTE, and, typically, up to six amounts of phase rotation are used. That is, in LTE, not all amounts of phase rotation can be used efficiently.

If all amounts of phase rotation are used to report UCI, UCI error occurs, and there is a possibility that the required quality for UCI cannot be fulfilled. However, when the UCI is an ACK/NACK, the required error rate (quality) for an SR may be higher (poorer) than the required error rate for UCI. Neighboring amounts of phase rotation may be used to report SR, and the amounts of phase rotation that correspond to multiple UCI values may be spaced apart, so that an SR can be reported without increasing the error rate of UCI. Thus, when reporting multiple types of information having varying required error rates, a sequence-based PUCCH can efficiently use spreading code resources.

Figure 10:
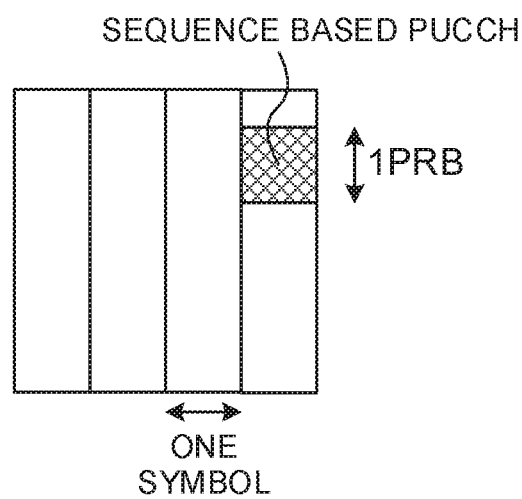
FIG. 10 is a diagram to show an example of a sequence-based PUCCH, where the bandwidth is constituted by one PRB.

FIG. 10 is a diagram to show an example of a sequence-based PUCCH where the bandwidth is constituted by one PRB. When the bandwidth of the sequence-based PUCCH is constituted by one PRB, twelve amounts of phase rotation $\alpha_0$ to $\alpha_{11}$ can be used.

Figure 11:
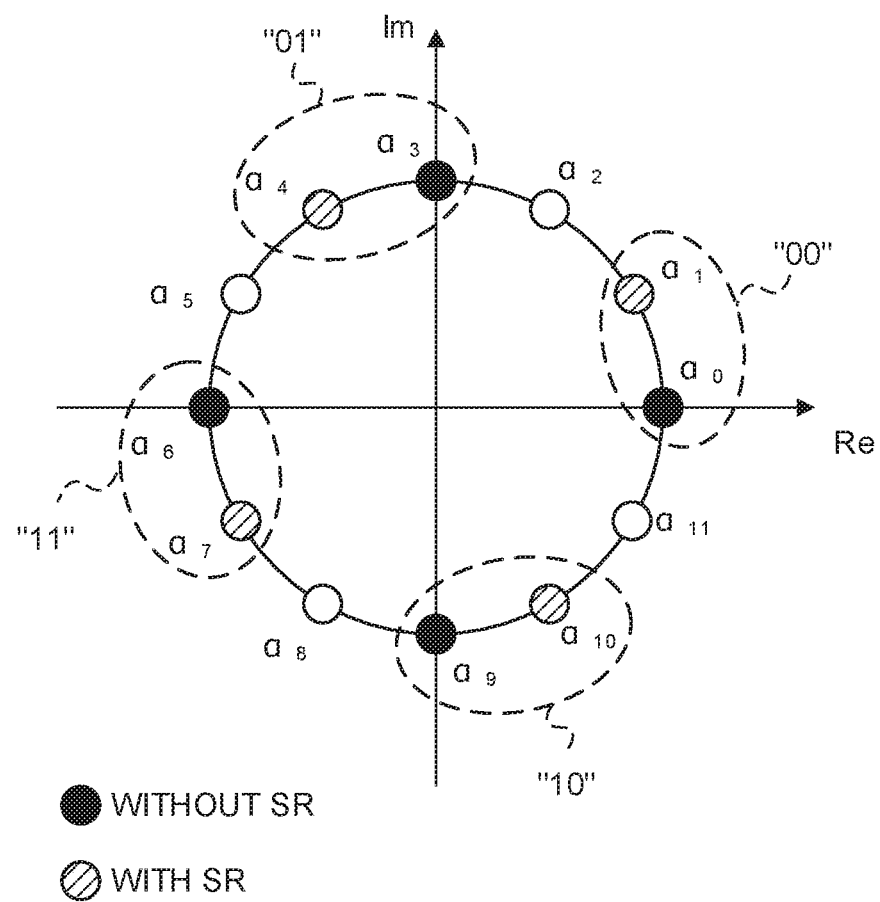
FIG. 11 is a diagram to show an assignment of amounts of phase rotation according to a third embodiment of the present invention.

FIG. 11 is a diagram to show assignment of amounts of phase rotation according to the third embodiment. $\alpha_0$, $\alpha_3$, $\alpha_6$ and $\alpha_9$ are the amounts of phase rotation that correspond to the UCI values "00," "01," "11," and "10" in the event an SR is absent, respectively. $\alpha_1$, $\alpha_4$, $\alpha_7$ and $\alpha_{10}$ are the amounts of phase rotation that correspond to the UCI values "00," "01," "11," and "10" in the event SR is present, respectively. Two amounts of phase rotation that correspond to the presence and absence of SR and that correspond to the same value of UCI neighbor each other, and amounts of phase rotation that correspond to different UCI values do not neighbor each other. Therefore, the error rate of UCI can be made lower than the error rate of SRs.

Also, as shown in FIG. 11, by using gray code for assigning amounts of phase rotation to UCI values, the error rate of UCI can be made lower.

The UE may assume that two (neighboring) spreading code resources with high cross-correlation are allocated to the presence and absence of SR. For example, two neighboring amounts of phase rotation are assigned to the presence and absence of SR.

As shown in FIG. 11, in the event $\alpha_0$, $\alpha_3$, $\alpha_6$ and $\alpha_9$ are reported from the network to the UE as amounts of phase rotation that correspond to the case where SR is absent, the UE may add 1 to the phase rotation amount index p of each amount of phase rotation $\alpha_p$, and have the amounts of phase rotation $\alpha_1$, $\alpha_4$, $\alpha_7$ and $\alpha_{10}$, which neighbor the amounts of phase rotation for the case where SR is absent, as amounts of phase rotation for the case where SR is present. As a result of this, only the amounts of phase rotation for the case where SR is absent can be reported from the network to the UE, so that the amount of information for reporting candidates for the spreading code resources can be reduced.

According to the third embodiment described above, it is possible to use spreading code resources efficiently and report an SR without increasing the error rate of UCI.

Fourth Embodiment

According to the fourth embodiment of the present invention, when the bandwidth (the number of PRBs) of a sequence-based PUCCH is constituted by two or more PRBs, more than twelve amounts of phase rotation are assigned to the UE.

In 5G/NR, cases might occur in which UCI is transmitted using two or more PRBs. When the PUCCH transmission band is increased, more amounts of phase rotation can be used. For example, when the PUCCH transmission band is constituted by two PRBs, twenty four subcarriers are included, so that twenty four amounts of phase rotation can be assigned to the UE. As described above, more amounts of phase rotation can be used than when the PUCCH transmission band is one PRB, so that the UCI payload length can be increased. Alternatively, the number of UEs to multiplex can be increased.

Also, by increasing the number of spreading code resources, cells that use the same spreading code resource can be placed further away. This can reduce inter-cell interference, and reduce the error rate of UCI.

Figure 12:
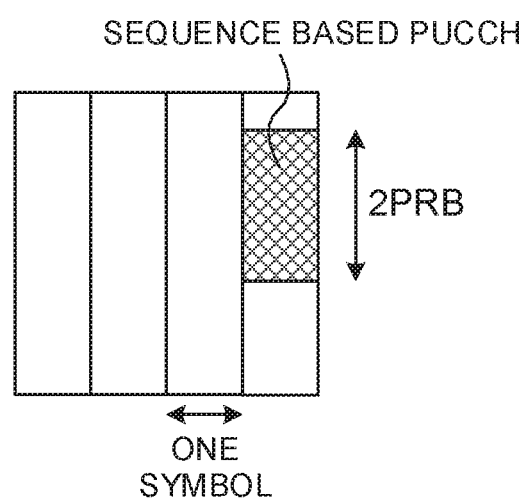
FIG. 12 is a diagram to show an example of a sequence-based PUCCH, where the bandwidth is constituted by two PRBs.

FIG. 12 is a diagram to show an example of a sequence-based PUCCH where the bandwidth is constituted by two PRBs. In this case, twenty four amounts of phase rotation $\alpha_0$ to $\alpha_{23}$ become available for use.

Figure 13:
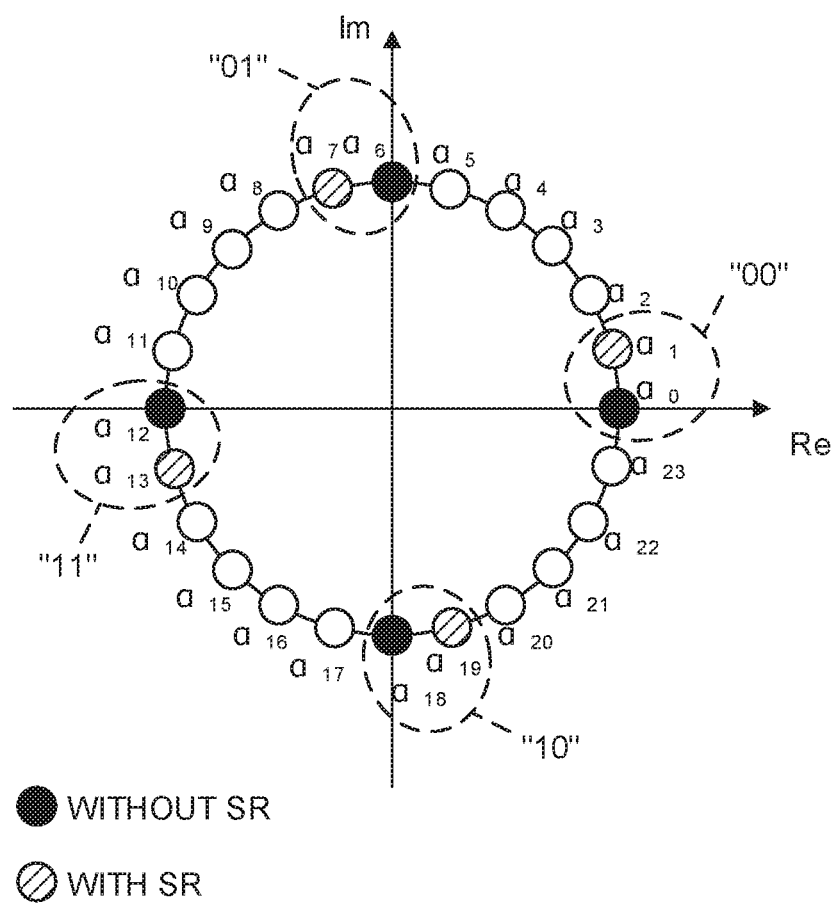
FIG. 13 is a diagram to show an assignment of amounts of phase rotation according to a fourth embodiment of the present invention.

FIG. 13 is a diagram to show assignment of amounts of phase rotation according to the fourth embodiment. $\alpha_0$, $\alpha_6$, $\alpha_{12}$, and as are the amounts of phase rotation that correspond to the UCI values "00," "01," "11," and "10" for when SR is absent, respectively. $\alpha_1$, $\alpha_7$, $\alpha_{13}$, and $\alpha_{19}$ are amounts of phase rotation that correspond to the UCI values "00," "01," "11," and "10" for when SR is present, respectively. Here, the amounts of phase rotation are assigned so that two amounts of phase rotation that correspond to the presence and absence of SR and that correspond to the same UCI value neighbor each other, but the interval between two amounts of phase rotation that correspond to different UCI values is the largest.

Compared to the case where the number of amounts of phase rotation is twelve, the intervals between amounts of phase rotation become smaller, and therefore the cross correlation between neighboring amounts of phase rotation may increase. Similar to the third embodiment, two neighboring amounts of phase rotation are assigned to the presence and absence of SR and the intervals between a plurality of amounts of phase rotation that correspond to different UCI values are widened, so that the error rate of UCI can be kept low.

Also, two amounts of phase rotation that correspond to the presence and absence of SR do not have to neighbor each other. This can reduce the error rate of SR reports.

In particular, when the bandwidth of a sequence-based PUCCH is large, a number of amounts of phase rotation to match the number of subcarriers (for example, the number of PRBs×12) of the sequence-based PUCCH become available for use at a maximum, so that two amounts of phase rotation that do not neighbor each other can be assigned to the presence and absence of SR.

As in the third embodiment (FIG. 11), only twelve amounts of phase rotation can be used when the bandwidth of a sequence-based PUCCH is constituted by one PRB, and, in order to report three bits (eight patterns), representing the presence or absence of SR and two-bit UCI, two neighboring amounts of phase rotation have to be assigned to the presence or absence of SR. On the other hand, when the bandwidth of a sequence-based PUCCH is constituted by two or more PRBs, it is not always necessary to assign two neighboring amounts of phase rotation to the presence and absence of SR.

The assignment pattern to indicate the amounts of phase rotation assigned to the report, or the intervals between the amounts of phase rotation assigned to the report may be reported from the network to the UE via higher layer signaling and/or physical layer signaling.

Figure 14:
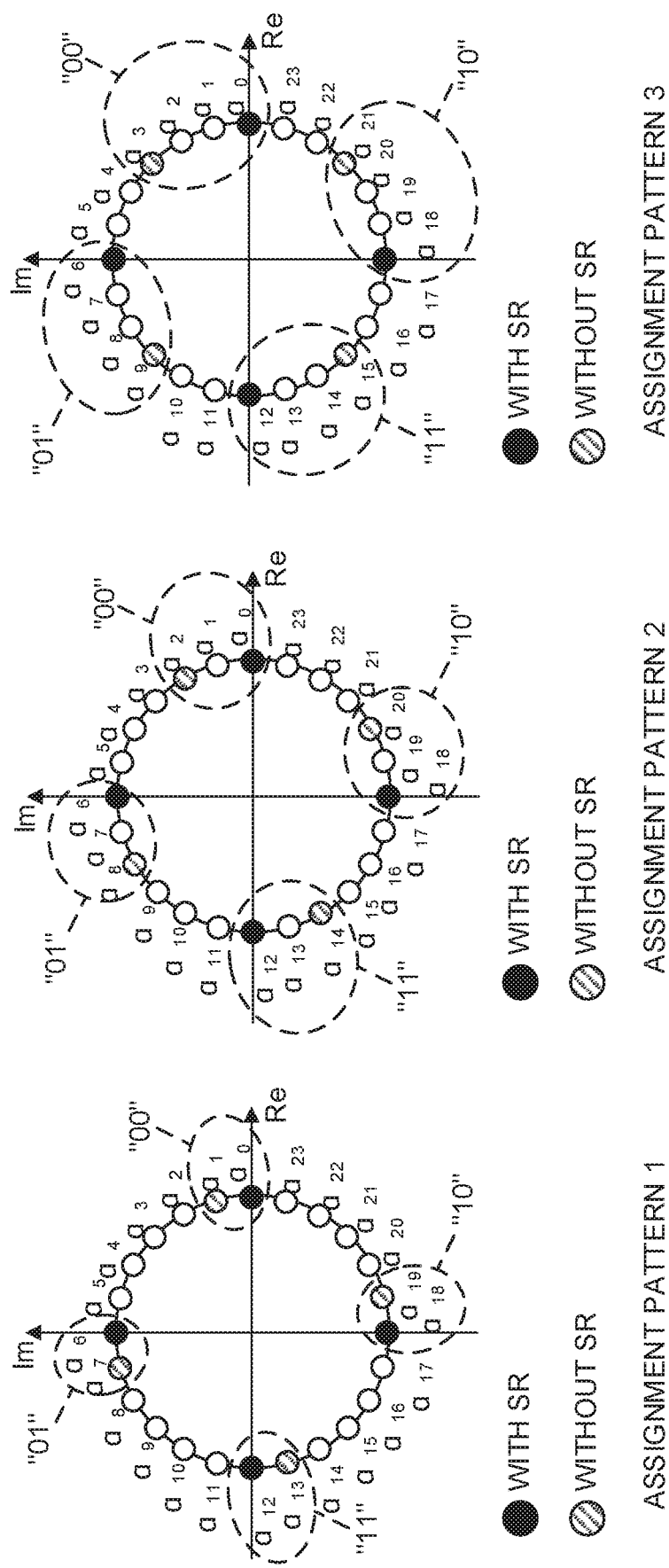
FIGS. 14A to 14C are diagrams to show examples of patterns assigning amounts of phase rotation.

FIG. 14 provide diagrams to show examples of pattern for assigning amounts of phase rotation. One of assignment patterns 1 to 3 is reported from the network to the UE. Here, the gap between two neighboring amounts of phase rotation is d, the interval between two amounts of phase rotation that correspond to the presence and absence of SR and that correspond to the same UCI value is the interval for assigning SRs, and the interval between two amounts of phase rotation that correspond to different UCI values is the interval for assigning UCI.

In the assignment pattern 1 shown in FIG. 14A, SRs are assigned at intervals of 1d, and UCI is assigned at intervals of 5d, as in FIG. 13. In assignment pattern 2 shown in FIG. 14B, SRs are assigned at intervals of 2d, and UCI is assigned at intervals of 4d. In assignment pattern 3 shown in FIG. 14C, SRs are assigned at intervals of 3d, and UCI is assigned at intervals of 3d. Therefore, if the assignment patterns are put in ascending order of the error rate of UCI, this gives assignment patterns 1, 2 and 3. Therefore, if the assignment patterns are put in ascending order of the error rate of SRs, this gives assignment patterns 3, 2 and 1. By this means, it is possible to use assignment patterns that are suitable for the required error rate of UCI, the required error rate of SRs, the number of UEs to be multiplexed, and so on.

The index numbers of these assignment patterns may be reported from the network to the UE. The intervals at which SRs are assigned and/or the intervals at which UCI is assigned may be reported from the network to the UE. This can reduce the amount of information for reporting the amounts of phase rotation.

It may also be assumed that the number of amounts of phase rotation is reported from the network to the UE.

The number of amounts of phase rotation that are available for use given the bandwidth (the number of PRBs) of a sequence-based PUCCH may be set forth in the specification, or reported by cell-specific information such as broadcast information. By this means, when the bandwidth of a sequence-based PUCCH is reported from the network, the UE can identify the number of amounts of phase rotation.

A table to show the number of amounts of phase rotation for the bandwidth of a sequence-based PUCCH may be defined, or a plurality of tables may be defined. FIG. 15 is a diagram to show an example of the configuration of the number of amounts of phase rotation for PUCCH bandwidth. Here, four tables of Alt. 1 to 4 are defined in advance.

A plurality of such tables may be configured in the UE as part of the specification, or reported from the network to the UE. The network may report PUCCH-related tables to the UE. Based on the information about the PUCCH, the UE may select one of Alts. 1, 2, 3 and 4.

Here, the selection of a table when the UE transmits either a DMRS-based PUCCH or a sequence-based PUCCH will be described.

Information to identify a sequence-based PUCCH or a DMRS-based PUCCH is reported from the network to the UE via higher layer signaling and/or physical layer signaling, and the UE may send a PUCCH identified in this information. Furthermore, the UE may select a sequence-based PUCCH or a DMRS-based PUCCH depending on the length of UCI payload.

For example, it is assumed that the UE may use Alt. 1 of FIG. 15 when transmitting a DMRS-based PUCCH, and use Alt. 3 of FIG. 15 when transmitting a sequence-based PUCCH. This eliminates the need to report the information to specify the table from the network to the UE.

Given the number of amounts of phase rotation determined by the table, the UE may use only a number of amounts of phase rotation to match a portion of the number of amounts of phase rotation depending on the length of UCI payload and the presence or absence of SR. The number of amounts of phase rotation may be associated with the intervals between the amounts of phase rotation, or may be associated with a set of amounts of phase rotation. Information about this association may be configured in the UE as part of the specification, or reported from the network to the UE via higher layer signaling and/or physical layer signaling. In accordance with this association, the UE may determine the intervals between the amounts of phase rotation used in the report or the set of amounts of phase rotation. For example, a set of amounts of phase rotation may be defined such that the interval between amounts of phase rotation corresponding to two values of UCI is the greatest.

In the event many amounts of phase rotation are available for use, two amounts of phase rotation that correspond to the presence and absence of SR, respectively, need not neighbor each other.

According to the fourth embodiment described above, when the PUCCH bandwidth is wide, it is possible to increase the length of UCI payload while keeping the error rate of UCI low.

Fifth Embodiment

According to a fifth embodiment of the present invention, different amounts of phase rotation for the same base sequence are assigned to a plurality of UEs, and sequence-based PUCCHs for a plurality of UEs are multiplexed in the same time/frequency resources.

Figure 16A:
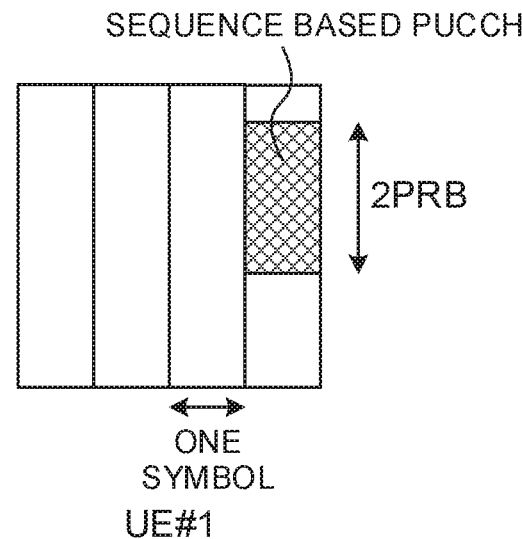
FIGS. 16A and 16B are diagrams to show examples of sequence-based PUCCHs that are subject to UE multiplexing.
Figure 16B:
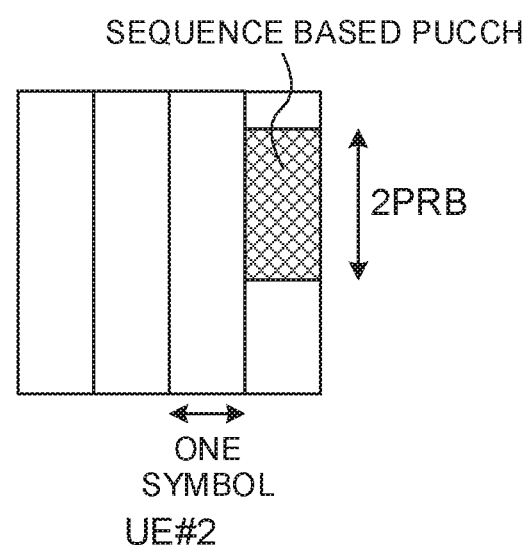

FIG. 16 provide diagrams to show examples of sequence-based PUCCHs that are subject to UE multiplexing. UE #1 transmits a sequence-based PUCCH using time/frequency resources of two PRBs as shown in FIG. 16A. UE #2 transmits a sequence-based PUCCH using the same time/frequency resources as those of UE #1, as shown in FIG. 16B.

Since the bandwidth of the sequence-based PUCCHs is constituted by two PRBs (twenty four subcarriers), twenty four amounts of phase rotation $\alpha_0$ to $\alpha_{23}$ can be used.

Figure 17:
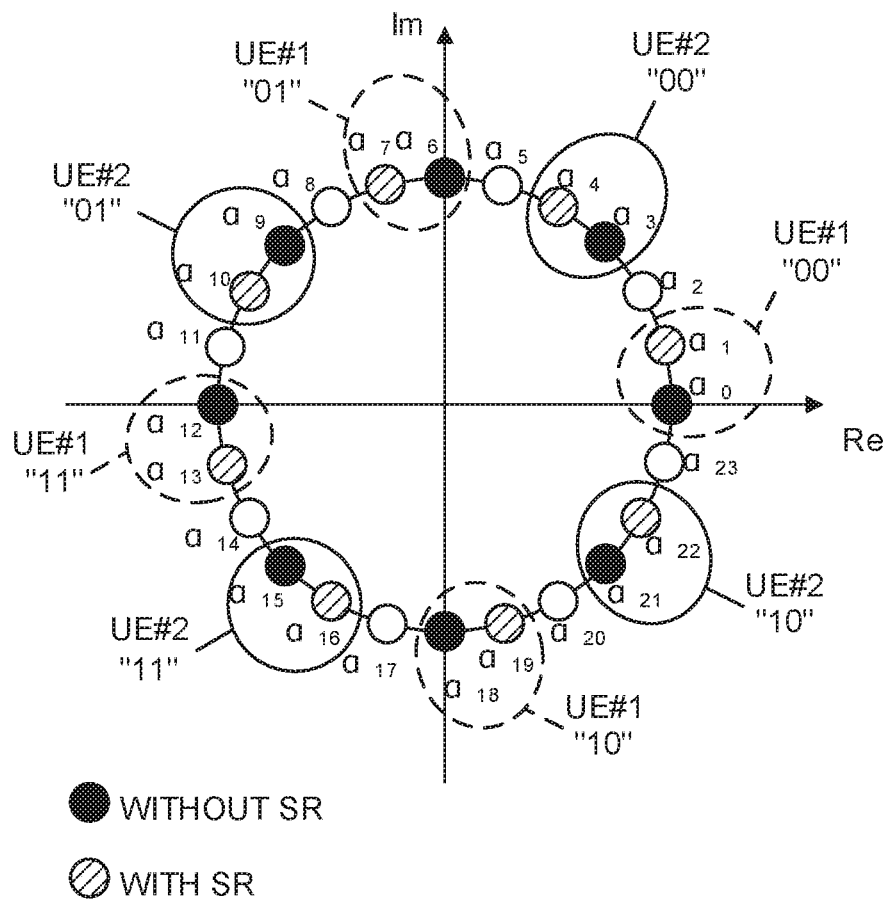
FIG. 17 is a diagram to show an example of assignment of amounts of phase rotation according to a fifth embodiment of the present invention.

FIG. 17 is a diagram to show an example of assignment of amounts of phase rotation according to the fifth embodiment.

In UE #1, $\alpha_0$, $\alpha_6$, $\alpha_{12}$, and $\alpha_{18}$ are the amounts of phase rotation that correspond to the UCI values "00," "01," "11," and "10" for use when SR is absent, respectively, and $\alpha_1$, $\alpha_7$, $\alpha_{13}$, and $\alpha_{19}$ are the amounts of phase rotation that correspond to the UCI values "00," "01," "11," and "10" for use when SR is present, respectively.

In UE #2, $\alpha_3$, $\alpha_9$, $\alpha_{15}$ and $\alpha_{21}$ are the amounts of phase rotation that correspond to the UCI values "00," "01," "11," and "10" for use when SR is absent, respectively, and $\alpha_4$, $\alpha_8$, $\alpha_{14}$ and $\alpha_{20}$ are the amounts of phase rotation that correspond to the UCI values "00," "01," "11," and "10" for use when SR is present, respectively.

In this way, by setting phase rotation amounts $\alpha_2$, $\alpha_5$, $\alpha_8$, $\alpha_{11}$, $\alpha_{14}$, $\alpha_{17}$, $\alpha_{20}$ and $\alpha_{23}$ that are not assigned (unassigned) to any UE, and by providing intervals between the amounts of phase rotation to allocate to UE #1 and the amounts of phase rotation to allocate to UE #2, even when a channel is strongly frequency-selective, the error rate of UCI can be kept low. On the other hand, by assigning amounts of phase rotation to the UE without spacing between the amounts of phase rotation, the number of UEs to be multiplexed can be increased.

Also, as with the third and fourth embodiments, by assigning two neighboring amounts of phase rotation to the presence and absence of SR and widening the intervals between amounts of phase rotation that correspond to different UCI values, the error rate of UCI can be kept low.

According to the fifth embodiment described above, it is possible to multiplex sequence-based PUCCHs for a plurality of UEs over the same time/frequency resources while keeping the error rate of UCI low.

Sixth Embodiment

According to a sixth embodiment of the present invention, the interval between amounts of phase rotation is changed based on the value of UCI. When the required error rate differs depending on the value of UCI, the intervals between a plurality of amounts of phase rotation that correspond to a plurality of candidate values of UCI, respectively, may not be constant.

FIG. 18 is a diagram to show examples of UCI values. When UCI is a 2-bit ACK/NACK of HARQ, "NACK-NACK," "ACK-NACK," "ACK-ACK," and "ACK-NACK" are represented by "00," "01," "11," and "10," respectively.

Figure 19:
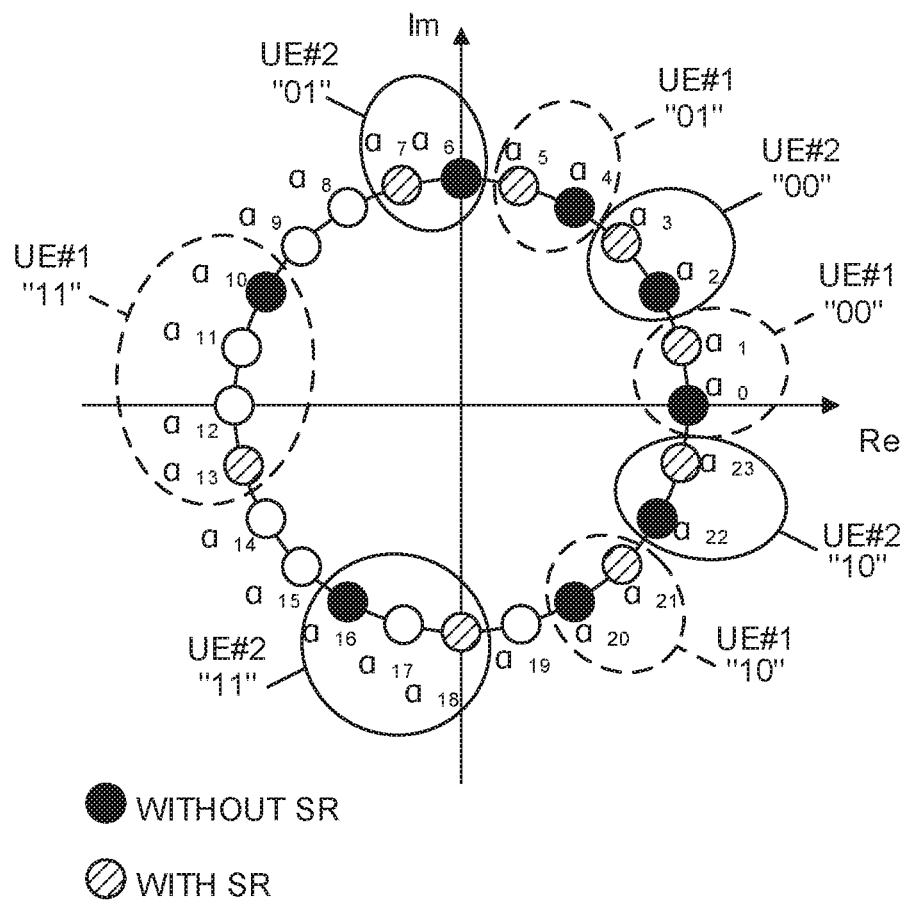
FIG. 19 is a diagram to show assignment of amounts of phase rotation according to a sixth embodiment of the present invention.

FIG. 19 is a diagram to show assignment of amounts of phase rotation according to the sixth embodiment. Here, the time/frequency resources for the sequence-based PUCCHs of UE #1 and #2 have a bandwidth of two PRBs as in FIG. 16, twenty four amounts of phase rotation $\alpha_0$ to $\alpha_{23}$ can be used.

In UE #1, $\alpha_0$, $\alpha_4$, $\alpha_{10}$ and $\alpha_{20}$ are the amounts of phase rotation that correspond to the UCI values "00," "01," "11," and "10" for when SR is absent, respectively, and $\alpha_1$, $\alpha_5$, $\alpha_{13}$, and $\alpha_{21}$ are the amounts of phase rotation that correspond to the UCI values "00," "01," "11," and "10" for when SR is present, respectively.

In UE #2, $\alpha_2$, $\alpha_6$, $\alpha_{16}$ and $\alpha_{22}$ are the amounts of phase rotation that correspond to the UCI values "00," "01," "11," and "10" for when SR is absent, respectively, and $\alpha_3$, $\alpha_7$, $\alpha_{18}$ and $\alpha_{23}$ are the amounts of phase rotation that correspond to the UCI values "00," "01," "11," and "10" for when SR is present, respectively.

For example, when each value of UCI occurs at a different rate and "ACK-ACK" (the UCI value "11") occurs at the highest rate, in particular, by reducing the errors of the value "11," the error rate of UCI can be reduced effectively. Here, the amount of phase rotation corresponding to the value "11" is spaced apart from the amounts of phase rotation corresponding to the other UEs and the other UCI values, so that the error rate of the value "11" can be made lower than the error rates of the other values. Here, while the amounts of phase rotation correspond to values other than the value 11" are continuous, the amounts of phase rotation that neighbor the amounts of phase rotation corresponding to the value "11" are not assigned values.

The intervals between the amounts of phase rotation may be different per UE or may be equal. For example, in UE #1, $\alpha_{10}$ may be made the amount of phase rotation to correspond to the UCI value "11" for when SR is absent, and $\alpha_{12}$ may be made the amount of phase rotation to correspond to the UCI value "11" for when SR is present, in UE #2, $\alpha_{15}$ may be made the amount of phase rotation to correspond to the UCI value "11" for when SR is absent, and $\alpha_{17}$ may be made the amount of phase rotation to correspond to the UCI value "11" for when SR is present. In this case, between UEs #1 and #2, the intervals between the amounts of phase rotation corresponding to the value "11" and the amounts of phase rotation corresponding to the other values can be made equal.

Note that, in the same UE, the amounts of phase rotation corresponding to the value "11" and the case without SR, and the amounts of phase rotation corresponding to the value "11" and the case with SR may neighbor each other.

Also, the intervals between the amounts of phase rotation may be changed according to at least one of the type of information to be reported, the value of UCI, and the UE.

According to the sixth embodiment described above, the interval between the amounts of phase rotation is changed depending on the value of UCI, so that the error rate of UCI can be kept low.

Seventh Embodiment

According to a seventh embodiment of the present invention, the network (for example, a radio base station) identifies UCI and/or SR from a received signal using maximum likelihood detection (which may be referred to as "MLD (Maximum Likelihood Detection)" or "correlation detection").

Here, although the receipt determination operation in the event UCI is reported by selecting the amount of phase rotation will be described, the same will apply to the case in which UCI is reported by making selections from the combinations of different types of resources (for example, base sequences, time/frequency resources, etc.) or a plurality of types of resources.

To be more specific, the network may generate replicas of every amount of phase rotation (phase rotation amount replica) assigned to a user terminal (for example, generate eight patterns of phase rotation amount replicas if the length of UCI payload is two bits and SR is one bit), and generate transmission signal waveforms, like the user terminal does, by using base sequences and UCI phase rotation amount replicas. Also, the network may calculate the correlation between a transmission signal waveform obtained thus, and the received signal waveform received from the user terminal, for all the phase rotation amount replicas, and assume that th phase rotation amount replica to show the highest correlation has been transmitted.

To be more specific, the network may multiply each element of received signal sequences of size M after DFT (M complex-number sequences) by complex conjugates of transmission signal sequences (M complex-number sequences), obtained by applying phase rotation to the base sequence of the transmission signal based on the phase rotation amount replicas, and assume that the phase rotation amount replica that makes the absolute value of the sum of the M sequences obtained (or the square of the absolute value) has been sent.

Alternatively, the network may generate phase rotation amount replicas to match the maximum number of amounts of phase rotation that can be assigned (24 for two PRBs), and estimate the amount of phase rotation that shows the highest correlation with the received signal based on the same operation as above MLD. When an amount of phase rotation apart from the assigned amounts of phase rotation is estimated, it is possible to assume that the one showing the closest estimated value among the assigned phase rotation amounts has been transmitted.

The method of identifying UCI and/or SR according to the seventh embodiment will be described.

The network may perform MLD of all patterns that may be transmitted in multiple time/frequency resources that correspond to the presence or absence of SR. For example, if the length of UCI payload is two bits, and the presence or absence of SR is one bit, the network performs eight patterns of MLD. As a result, the error rate of UCI can be kept low.

Alternatively, the network may measure the received power of each of a plurality of time/frequency resources, estimate that a sequence-based PUCCH has been transmitted with the time/frequency resource having the largest received power, and determine whether SR is present or absent depending on the estimated time/frequency resource. Thereafter, the network may determine the value of UCI by MLD. When the length of UCI payload is two bits, MLD with four patterns is performed. This will reduce the amount of processing in the MLD.

(Radio Communication System)

Now, the structure of a radio communication system according to one embodiment of the present invention will be described below. In this radio communication system, communication is performed using one or a combination of the radio communication methods according to the herein-contained embodiments of the present invention.

Figure 20:
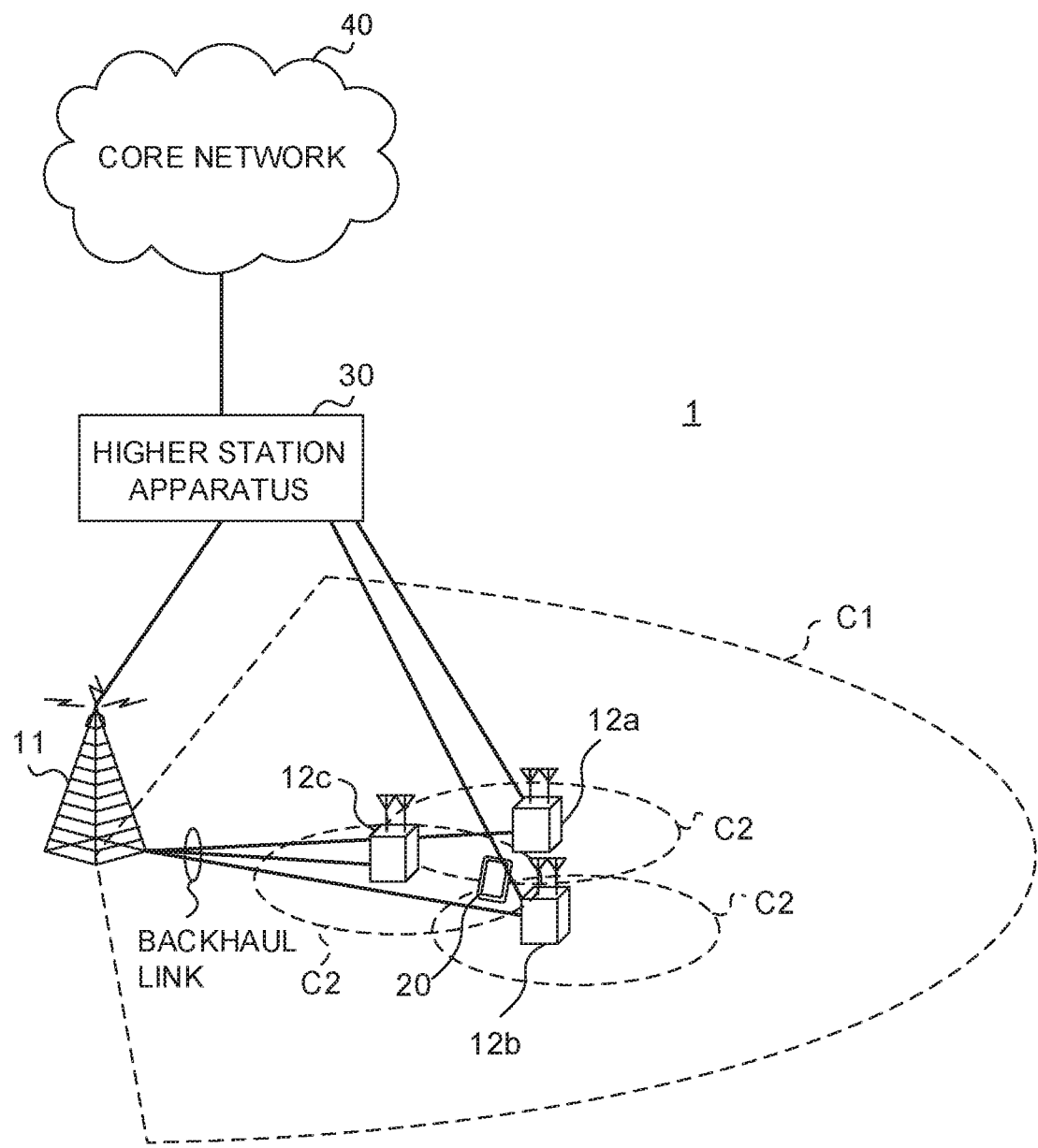
FIG. 20 is a diagram to show an example of a schematic structure of a radio communication system according to one embodiment of the present invention.

FIG. 20 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)," and so on, or may be seen as a system to implement these.

The radio communication system 1 includes a radio base station 11 that forms a macro cell C1 covering a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement, number and so on of cells and user terminals are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and other radio access schemes can be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, downlink control information (DCI) and so on, is communicated by the PDCCH.

Note that scheduling information may be reported via DCI. For example, the DCI for scheduling DL data reception may be referred to as "DL Assignment", the DCI to schedule UL data transmission may be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication systems 1, cell-specific reference signal (CRSs), channel state information reference signal (CSI-RSs), demodulation reference signal (DMRSs), positioning reference signal (PRSs) and so on are communicated as downlink reference signals. Also, in the radio communication system 1, measurement reference signals (SRSs: Sounding Reference Signals), demodulation reference signals (DMRSs) and so on are communicated as uplink reference signals. Note that, DMRSs may be referred to as user terminal-specific reference signals (UE-specific Reference Signals). Also, the reference signals to be communicated are by no means limited to these.

<Radio Base Station>

Figure 21:
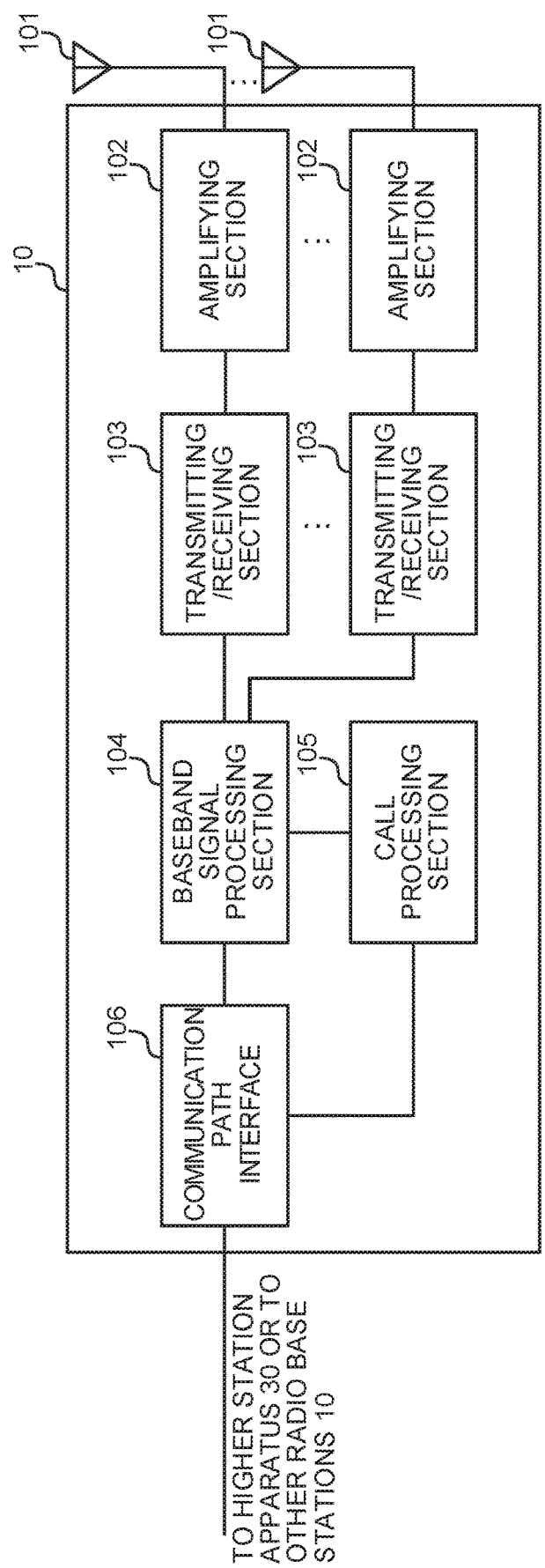
FIG. 21 is a diagram to show an example of an overall structure of a radio base station according to one embodiment of the present invention.

FIG. 21 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

In addition, the transmitting/receiving sections 103 may transmit, to the user terminals 20, information that associates a plurality of candidates for a spreading code resource with a plurality of candidate values of UL control information, which does include a scheduling request (SR), and the presence and absence of SR.

Figure 22:
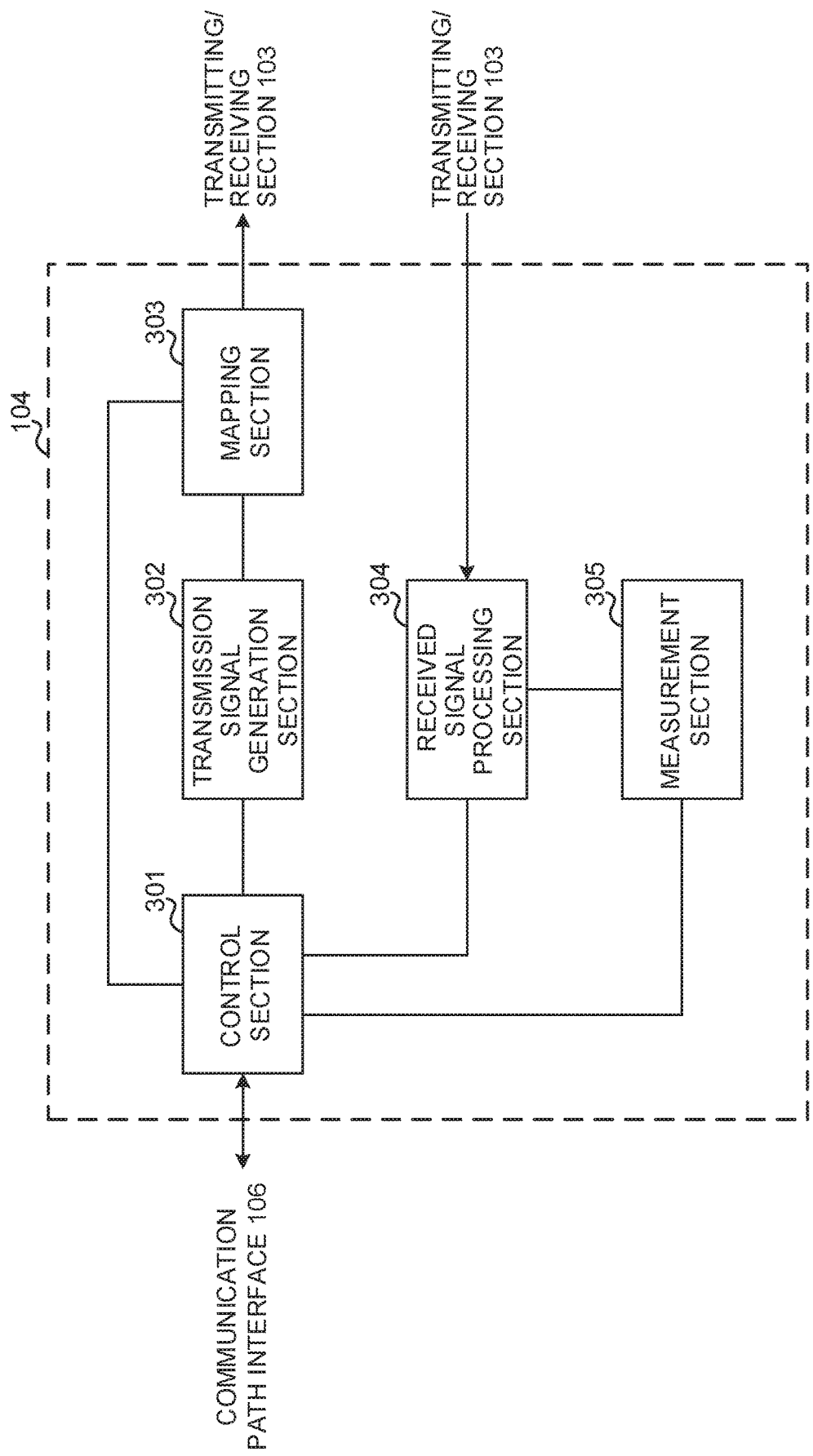
FIG. 22 is a diagram to show an example of a functional structure of a radio base station according to one embodiment of the present invention.

FIG. 22 is a diagram to show an example of a functional structure of a radio base station according to one embodiment of the present invention. Note that, although this example will primarily show functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgement information). The control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DM-RS, etc.) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), uplink reference signals, and/or other signals.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generation apparatus that can be described based on general understanding of the technical field to which the present invention pertains.

For example, the transmission signal generation section 302 generates DL assignments, which report downlink data allocation information, and UL grants, which report uplink data allocation information, based on commands from the control section 301. DL assignments and UL grants are both DCI, and follow the DCI format. Also, the downlink data signals are subjected to the coding process, the modulation process and so on, by using coding rates and modulation schemes that are determined based on, for example, channel state information (CSI) reported from each user terminal 20.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI), and so on. The measurement results may be output to the control section 301.

In addition, the control section 301 may controls assignment of resources for reporting UL control information to the user terminals 20. Also, when allocating resources for reporting UL control information to a plurality of user terminals, the control section 301 may allocate resources that are orthogonal to each other, to a plurality of user terminals.

Furthermore, the control section 301 may identifying the UL control information based on the processing result in the received signal processing section 304, or identify the UL control information that is associated with the time resource and/or the frequency resource based on the measurement result (for example, the measurement result of received power) acquired from the measurement section 305.

Figure 23:
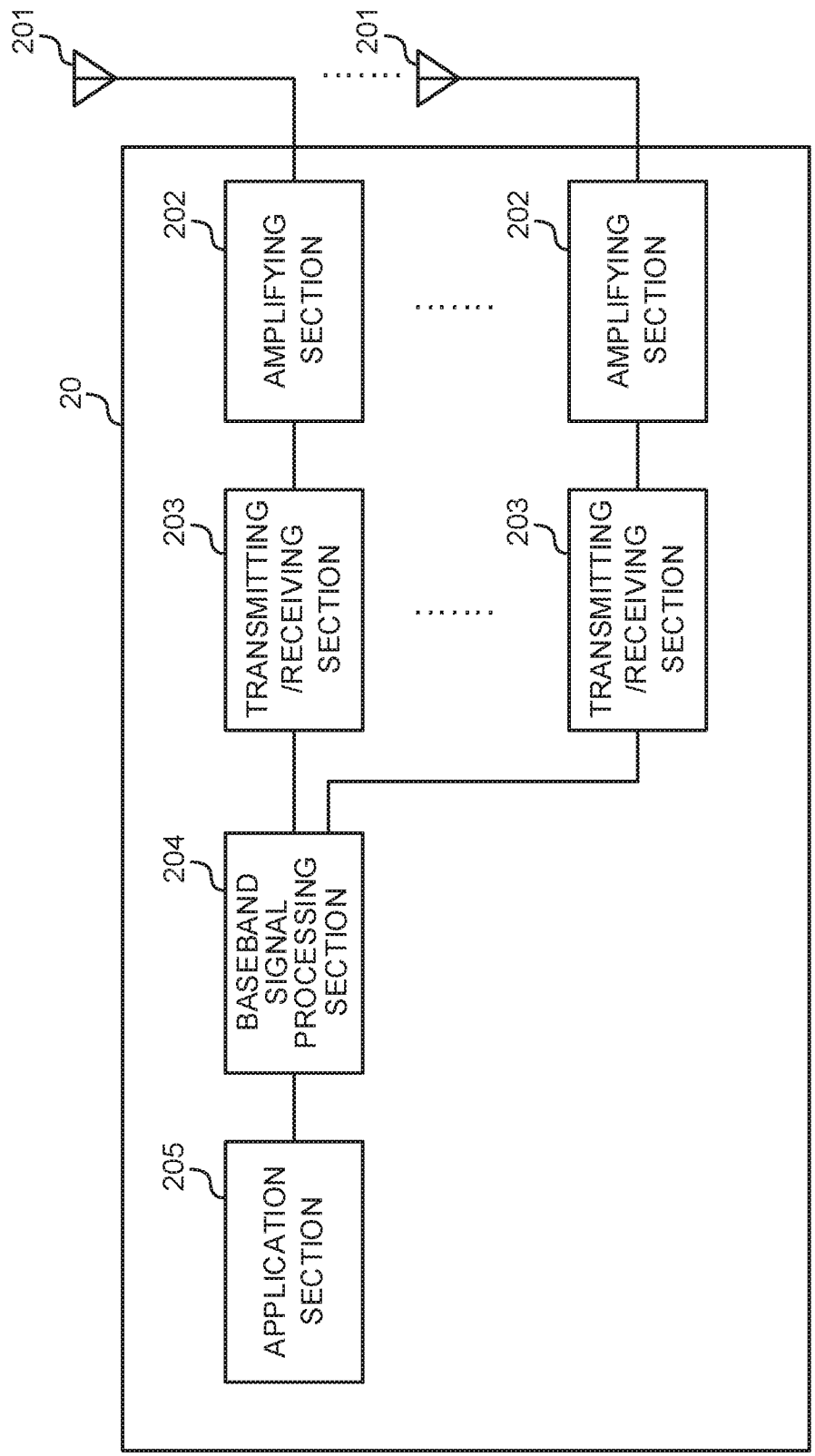
FIG. 23 is a diagram to show an example of an overall structure of a user terminal according to one embodiment of the present invention.

(User Terminal) FIG. 23 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. In the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 may receive information that associates a plurality of candidates for a spreading code resource with a plurality of candidate values of UL control information, which does not include an SR, and the presence and absence of SR.

Also, the transmitting/receiving section 203 may receive information that associates a plurality of candidates for a spreading code resource with a plurality of candidate values of UL control information, respectively, and information that associates two candidates of a frequency resource and/or a time resource with the presence and absence of SR, respectively.

Figure 24:
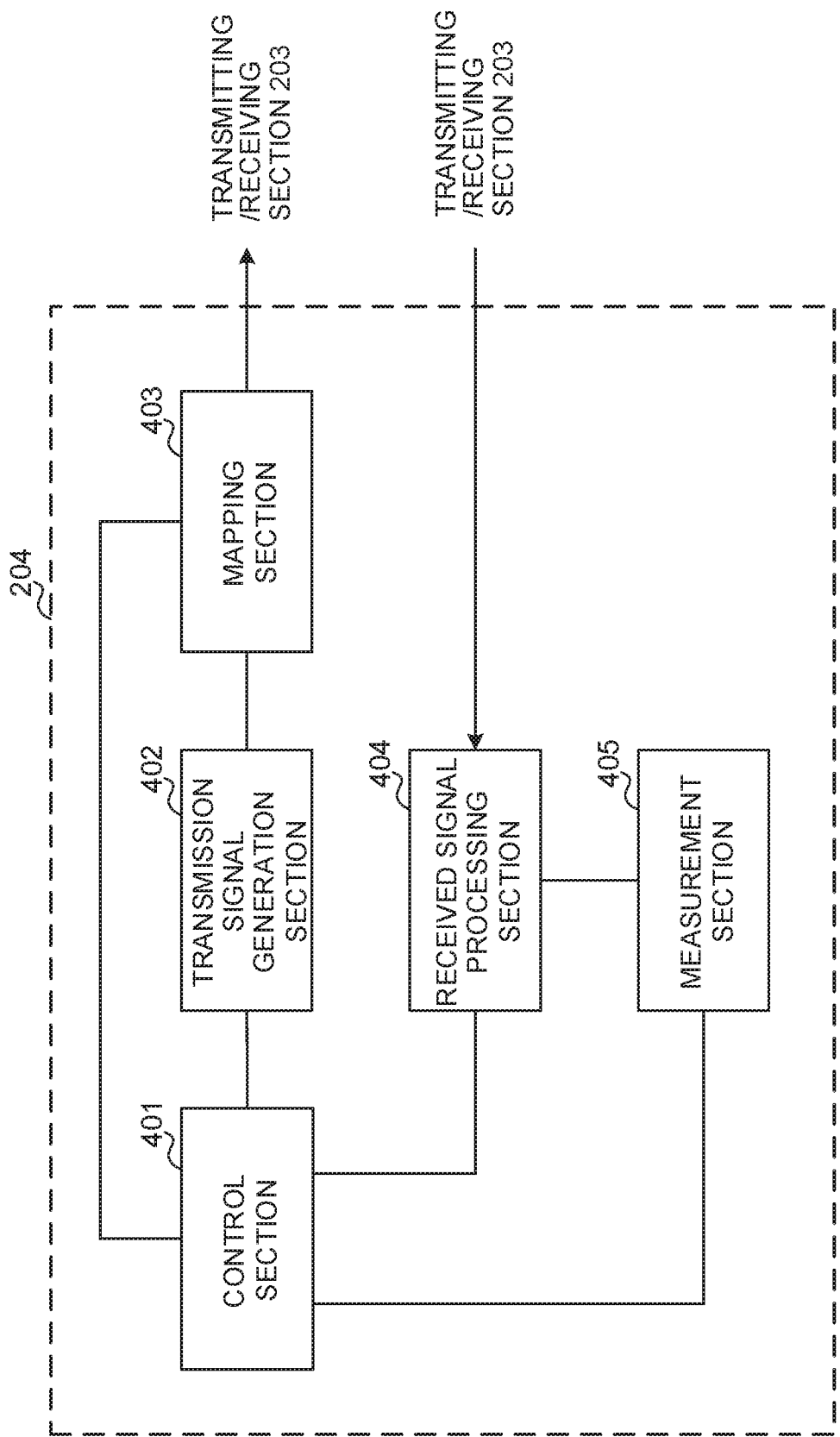
FIG. 24 is a diagram to show an example of a functional structure of a user terminal according to one embodiment of the present invention.

FIG. 24 is a diagram to show an example of a functional structure of a user terminal according to the present embodiment. Note that, although this example will primarily show functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations may be included in the user terminal 20, and some or all of the configurations need not be included in the baseband signal processing section 204.

The control section 401 controls the whole of the user terminal 20. The control section 401 can be constituted by a controller, a control circuit or control apparatus that can be described based on general understanding of the technical field to which the present invention pertains.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving section 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 output the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements and so on based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

In addition, the transmission signal generation section 402 may generate a UL signal using a resource that is associated with the presence or absence of a scheduling request (SR).

Also, the transmission signal generation section 402 may generate a UL signal by using a spreading code resource that corresponds to a value of UL control information and the presence or absence of SR.

Also, the spreading code resource may include the amount of phase rotation. The interval between two amounts of phase rotation associated with the presence and absence of SR, respectively, may be smaller than the interval between a plurality of amounts of phase rotation that are respectively associated with a plurality of candidate values.

In addition, the plurality of candidate values may include a specific value and a plurality of non-specific values. In addition, the interval between a plurality of amounts of phase rotation that correspond to a plurality of specific values, respectively, may be smaller than the intervals between the amount of phase rotation corresponding to the specific value and each of the plurality of amounts of phase rotation.

The interval between the amount of phase rotation for a user terminal 20 corresponding to a non-specific value and the amount of phase rotation for another user terminal corresponding to a non-specific value may be smaller than the interval between the amount of phase rotation for the user terminal 20 corresponding to a specific value and the amount of phase rotation for another user terminal corresponding to the specific value.

Also, the transmission signal generation section 402 may use the spreading code resource corresponding to the value of UL control information and the frequency resource and/or the time resource corresponding to the presence or absence of the SR to generate a UL signal.

<Hardware Structure>

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 25:
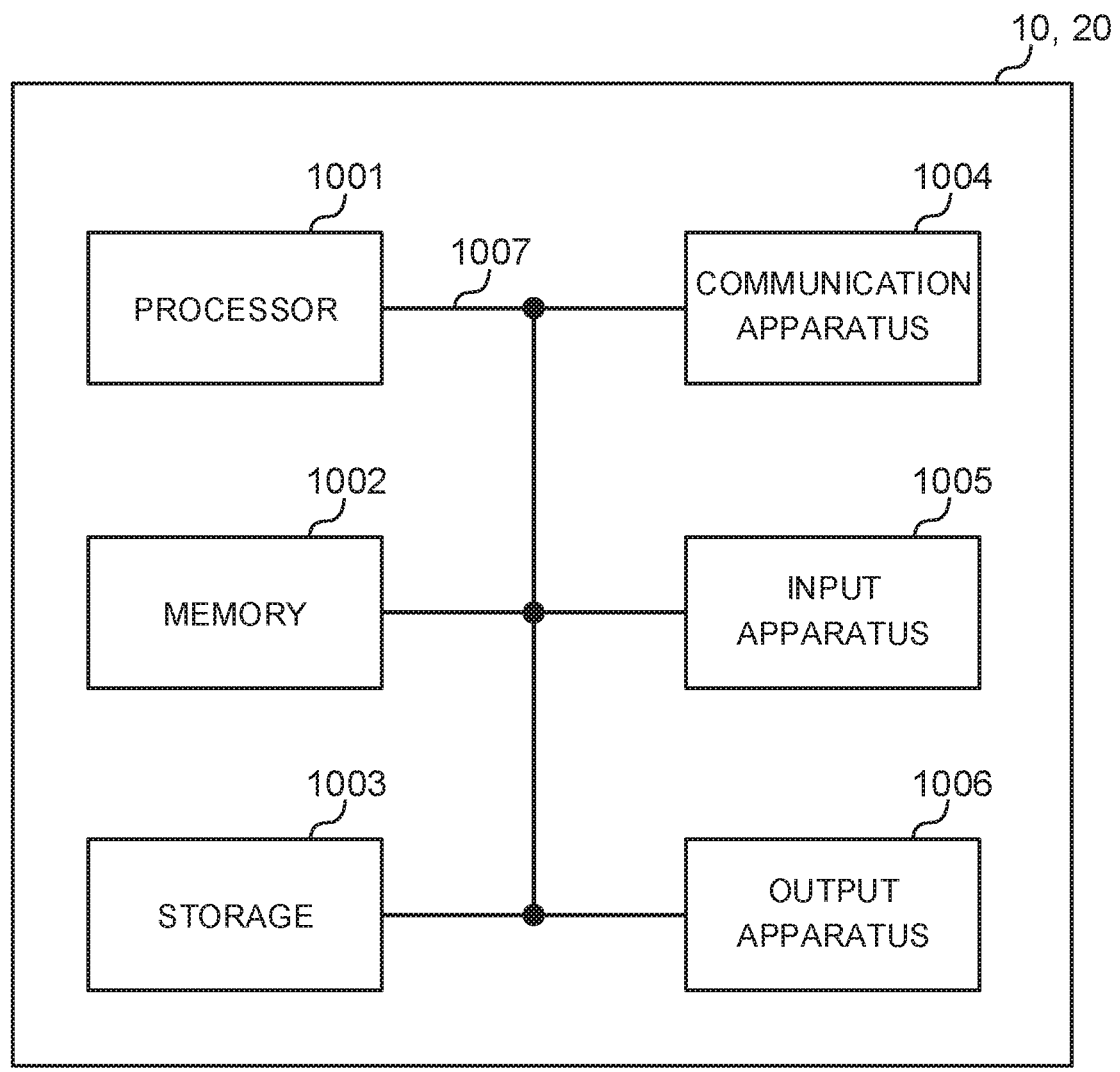
FIG. 25 is a diagram to show an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 25 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading given software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations) Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, one ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of mini-slots. Each mini-slot may consist of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, one subframe may be referred to as a "transmission time interval (TTI)," or a plurality of consecutive subframes may be referred to as a "TTI," or one slot or mini-slot may be referred to as a "TTI." That is, a subframe and/or a TTI may be a subframe (one ms) in existing LTE, may be a shorter period than one ms (for example, one to thirteen symbols), or may be a longer period of time than one ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the period of time (for example, the number of symbols) in which transport blocks, code blocks and/or codewords are actually mapped may be shorter than the TTI.

Note that, when one slot or one mini-slot is referred to as a "TTI," one or more TTIs (that is, one or more slots or one or more mini-slots) may be the minimum time unit of scheduling. Also, the number of slots (the number of mini-slots) to constitute this minimum time unit of scheduling may be controlled.

A TTI having a time duration of one ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI")," a "shortened subframe," a "short subframe," a "mini-slot," "a sub-slot" and so on.

Note that a long TTI (for example, a normal TTI, a subframe, etc.) may be replaced with a TTI having a time duration exceeding one ms, and a short TTI (for example, a shortened TTI) may be replaced with a TTI having a TTI length less than the TTI length of a long TTI and not less than one ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one mini-slot, one subframe or one TTI in length. One TTI and one subframe each may be comprised of one or more resource blocks. Note that one or more RBs may be referred to as a "physical resource block (PRB: Physical RB)," a "subcarrier group (SCG: Sub-Carrier Group)," a "resource element group (REG)," an "PRB pair," an "RB pair" and so on.

Furthermore, a resource block may be comprised of one or more resource elements (REs). For example, one RE may be a radio resource region of one subcarrier and one symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to given values, or may be represented in other information formats. For example, radio resources may be specified by given indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-017973, filed on Feb. 2, 2017, including the specification, drawings and abstract, is incorporated herein by reference in its entirety.

The invention claimed is:

1. A terminal comprising:
a processor that determines a cyclic shift based on uplink control information including a positive scheduling request (SR) and a Hybrid Automatic Repeat reQuest-Acknowledge (HARQ-ACK) or including a negative SR and HARQ-ACK and on configuration information notified by a higher layer; and
a transmitter that transmits the uplink control information by using a sequence using the determined cyclic shift,
wherein a cyclic shift that corresponds to a first uplink control information including a value of the HARQ-ACK and the positive SR is a sum of a constant and a cyclic shift that corresponds to a second uplink control information including a value of the HARQ-ACK and the negative SR, and
wherein if the uplink control information is a 2-bit HARQ-ACK, four values of cyclic shifts correspond to four values of the HARQ-ACK and each cyclic shift is spaced apart by $\pi/2$.

2. The terminal according to claim 1, wherein the constant is $\pi/6$.

3. The terminal according to claim 1, wherein
a cyclic shift based on a value '01' of the HARQ-ACK and the positive SR is a sum of a cyclic shift based on a value '00' of the HARQ-ACK and the positive SR, and $\pi/2$;
a cyclic shift based on a value '11' of the HARQ-ACK and the positive SR is a sum of a cyclic shift based on the value '00' of the HARQ-ACK and the positive SR, and $\pi$; and
a cyclic shift based on a value '10' of the HARQ-ACK and the positive SR is a sum of a cyclic shift based on the value '00' of the HARQ-ACK and the positive SR, and $3\pi/2$.

4. The terminal according to claim 1, wherein a plurality of integers to determine the cyclic shift are associated with a 2-bit HARQ-ACK value and the positive SR or with the 2-bit HARQ-ACK value and the negative SR, and an integer associated with a given 2-bit HARQ-ACK value and the positive SR is a sum of 1 and an integer associated with the given 2-bit HARQ-ACK value and the negative SR.

5. The terminal according to claim 4, wherein
an integer associated with a 2-bit HARQ-ACK value '00' and the negative SR is 0,
an integer associated with a 2-bit HARQ-ACK value '01' and the negative SR is 3,
an integer associated with a 2-bit HARQ-ACK value '11' and the negative SR is 6, and
an integer associated with a 2-bit HARQ-ACK value '10' and the negative SR is 9.

6. The terminal according to claim 5, wherein
an integer associated with the 2-bit HARQ-ACK value '00' and the positive SR is 1,
an integer associated with the 2-bit HARQ-ACK value '01' and the positive SR is 4,
an integer associated with a 2-bit HARQ-ACK value '11' and the positive SR is 7, and
an integer associated with a 2-bit HARQ-ACK value '10' and the positive SR is 10.

7. A radio base station for a terminal, comprising:
determining a cyclic shift based on uplink control information including a positive scheduling request (SR) and a Hybrid Automatic Repeat reQuest-Acknowledge (HARQ-ACK) or including a negative SR and HARQ-ACK and on configuration information notified by a higher layer; and
transmitting the uplink control information by using a sequence using the determined cyclic shift,
wherein a cyclic shift that corresponds to first uplink control information including a value of the HARQ-ACK and the positive SR is a sum of a constant and a cyclic shift that corresponds to second uplink control information including a value of the HARQ-ACK and the negative SR, and
wherein if the uplink control information is a 2-bit HARQ-ACK, four values of cyclic shifts correspond to four values of the HARQ-ACK and each cyclic shift is spaced apart by $\pi/2$.

8. The terminal according to claim 2, wherein a plurality of integers to determine the cyclic shift are associated with a 2-bit HARQ-ACK value and the positive SR or with the 2-bit HARQ-ACK value and the negative SR, and an integer associated with a given 2-bit HARQ-ACK value and the positive SR is a sum of 1 and an integer associated with the given 2-bit HARQ-ACK value and the negative SR.

9. The terminal according to claim 3, wherein a plurality of integers to determine the cyclic shift are associated with a 2-bit HARQ-ACK value and the positive SR or with the 2-bit HARQ-ACK value and the negative SR, and an integer associated with a given 2-bit HARQ-ACK value and the positive SR is a sum of 1 and an integer associated with the given 2-bit HARQ-ACK value and the negative SR.

10. A radio communication method for a terminal, the method comprising:
determining a cyclic shift based on uplink control information including a positive scheduling request (SR) and a Hybrid Automatic Repeat reQuest-Acknowledge (HARQ-ACK) or including a negative SR and HARQ-ACK and on configuration information notified by a higher layer; and
transmitting the uplink control information by using a sequence using the determined cyclic shift,
wherein a cyclic shift that corresponds to a first uplink control information including a value of the HARQ-ACK and the positive SR is a sum of a constant and a cyclic shift that corresponds to a second uplink control information including a value of the HARQ-ACK and the negative SR, and wherein if the uplink control information is a 2-bit HARQ-ACK, four values of cyclic shifts correspond to four values of the HARQ-ACK and each cyclic shift is spaced apart by $\pi/2$.

11. A system comprising:
a terminal that comprises:
- a processor that determines a cyclic shift based on uplink control information including a positive scheduling request (SR) and a Hybrid Automatic Repeat reQuest-Acknowledge (HARQ-ACK) or including a negative SR and HARQ-ACK and on configuration information notified by a higher layer; and
- a transmitter that transmits the uplink control information by using a sequence using the determined cyclic shift, and a base station that receives the uplink control information,
wherein a cyclic shift that corresponds to a first uplink control information including a value of the HARQ-ACK and the positive SR is a sum of a constant and a cyclic shift that corresponds to a second uplink control information including a value of the HARQ-ACK and the negative SR, and
wherein if the uplink control information is a 2-bit HARQ-ACK, four values of cyclic shifts correspond to four values of the HARQ-ACK and each cyclic shift is spaced apart by $\pi/2$.

* * * * *